(12) United States Patent
Takeda et al.

(10) Patent No.: US 11,700,614 B2
(45) Date of Patent: Jul. 11, 2023

(54) CONFIGURING DOWNLINK CONTROL INFORMATION TO SCHEDULE MULTIPLE COMPONENT CARRIERS

(71) Applicant: QUALCOMM Incorporated, San Diego, CA (US)

(72) Inventors: Kazuki Takeda, Tokyo (JP); Alberto Rico Alvarino, San Diego, CA (US); Peter Gaal, San Diego, CA (US); Huilin Xu, Temecula, CA (US); Wanshi Chen, San Diego, CA (US); Tao Luo, San Diego, CA (US); Mostafa Khoshnevisan, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 17/192,782

(22) Filed: Mar. 4, 2021

(65) Prior Publication Data

US 2021/0410120 A1    Dec. 30, 2021

Related U.S. Application Data

(60) Provisional application No. 63/043,746, filed on Jun. 24, 2020.

(51) Int. Cl.
*H04W 72/23*    (2023.01)
*H04W 72/0453*    (2023.01)

(52) U.S. Cl.
CPC ....... *H04W 72/23* (2023.01); *H04W 72/0453* (2013.01)

(58) Field of Classification Search
CPC ......... H04W 72/1289; H04W 72/0453; H04W 72/042

(Continued)

(56) References Cited

U.S. PATENT DOCUMENTS

2011/0299513 A1* 12/2011 Suzuki .................. H04L 5/0007
                                                                      370/338
2012/0188961 A1*  7/2012 Suzuki .............. H04W 74/0833
                                                                      370/329

(Continued)

FOREIGN PATENT DOCUMENTS

EP      2403307 A1    1/2012
EP      2464190 A1    6/2012

(Continued)

OTHER PUBLICATIONS

International Search Report and Written Opinion—PCT/US2021/033846—ISA/EPO—dated Oct. 12, 2021.

*Primary Examiner* — Peter G Solinsky
(74) *Attorney, Agent, or Firm* — Holland & Hart LLP

(57) ABSTRACT

Methods, systems, and devices for wireless communications are described. A user equipment (UE) may connect with a base station over a set of component carriers according to a carrier aggregation configuration. The UE may then monitor a search space configured for scheduling multiple component carriers and may receive downlink control information (DCI) based on monitoring the search space. The DCI may include a carrier indicator field (CIF) and may schedule a set of data transmissions over two or more component carriers (e.g., from the set of component carriers). The UE may determine that the two or more component carriers include the first component carrier and the second component carrier based on the monitored search space, the CIF within the DCI, or both. The UE may then transmit and receive the set of data transmissions over the first and second component carriers.

30 Claims, 20 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2013/0022014 | A1* | 1/2013 | Hong | ...................... H04L 5/001 |
| | | | | 370/329 |
| 2013/0028108 | A1* | 1/2013 | Wu | ...................... H04L 5/0094 |
| | | | | 370/252 |
| 2014/0126490 | A1* | 5/2014 | Chen | ...................... H04L 5/0035 |
| | | | | 370/328 |
| 2017/0079013 | A1* | 3/2017 | Noh | ...................... H04W 72/23 |
| 2018/0115399 | A1* | 4/2018 | Takeda | .................. H04L 5/0053 |
| 2018/0279344 | A1* | 9/2018 | Bagheri | .............. H04W 72/044 |
| 2018/0310340 | A1* | 10/2018 | Noh | .................. H04W 74/0825 |

FOREIGN PATENT DOCUMENTS

| | | | | |
|---|---|---|---|---|
| EP | 2525597 | A1 | 11/2012 | |
| EP | 3410796 | B1 * | 11/2020 | ......... H04L 27/2602 |
| EP | 3896893 | A4 * | 10/2021 | |

\* cited by examiner

CONFIGURING DOWNLINK CONTROL INFORMATION TO SCHEDULE MULTIPLE COMPONENT CARRIERS

CROSS REFERENCE

The present application for patent claims the benefit of U.S. Provisional Patent Application No. 63/043,746 by TAKEDA et al., entitled "CONFIGURING DOWNLINK CONTROL INFORMATION TO SCHEDULE MULTIPLE COMPONENT CARRIERS," filed Jun. 24, 2020, assigned to the assignee hereof, and expressly incorporated by reference herein.

TECHNICAL FIELD

The following relates generally to wireless communications and more specifically to configuring downlink control information (DCI) to schedule multiple component carriers.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may support carrier aggregation, where the UE communicates with multiple cells simultaneously. For example, the UE may communicate with a first base station (e.g., a primary cell (PCell), a first component carrier) and with a second base station (e.g., a secondary cell (SCell), a second component carrier) at the same time. Additionally or alternatively, a single base station may include multiple cells (e.g., both a PCell and an SCell, multiple component carriers), where the UE communicates with two or more cells on the single base station at the same time. Efficient techniques are desired for enabling carrier aggregation communications.

SUMMARY

The described techniques relate to improved methods, systems, devices, and apparatuses that support configuring downlink control information (DCI) to schedule multiple component carriers. Generally, the described techniques provide for improving multi-component carrier scheduling procedures. A user equipment (UE) may establish a connection with a base station over a set of component carriers including at least a first component carrier and a second component carrier. The base station may subsequently transmit configuration information to the UE indicating one or more search spaces for the UE to monitor and receive DCI. The configuration information may indicate an association between the search space and one or more component carriers associated with that search space. Additionally, the configuration may indicate an association between possible values of a carrier indicator field (CIF) within DCI and one or more component carriers. The UE may monitor the search space and may receive, from the base station, DCI based on monitoring the search space. The DCI may schedule a set of data transmissions over two or more component carriers from the set of component carriers. The UE may determine that the two or more component carriers include the first and second component carriers based on the monitored search space, the CIF field within the DCI, or both. The UE may then transmit or receive the scheduled data transmissions over the first and second component carriers.

A method of wireless communication is described. The method may include connecting to a base station over a set of component carriers according to a carrier aggregation configuration, the set of component carriers including at least a first component carrier and a second component carrier, monitoring a search space configured for scheduling multiple component carriers, receiving, from the base station, DCI including a CIF based on the monitoring, the DCI scheduling a set of data transmissions over two or more component carriers from the set of component carriers, determining that the two component carriers include the first component carrier and the second component carrier based on the monitored search space, the CIF within the DCI, or both, and transmitting or receiving the set of data transmissions over the first component carrier and the second component carrier based on the determining.

An apparatus for wireless communication is described. The apparatus may include at least one processor, memory coupled (e.g., operatively, communicatively, functionally, electronically, electrically) to the at least one processor, and instructions stored in the memory. The instructions may be executable by the at least one processor to cause the apparatus to connect to a base station over a set of component carriers according to a carrier aggregation configuration, the set of component carriers including at least a first component carrier and a second component carrier, monitor a search space configured for scheduling multiple component carriers, receive, from the base station, DCI including a CIF based on the monitoring, the DCI scheduling a set of data transmissions over two or more component carriers from the set of component carriers, determine that the two component carriers include the first component carrier and the second component carrier based on the monitored search space, the CIF within the DCI, or both, and transmit or receive the set of data transmissions over the first component carrier and the second component carrier based on the determining.

Another apparatus for wireless communication is described. The apparatus may include means for connecting to a base station over a set of component carriers according to a carrier aggregation configuration, the set of component carriers including at least a first component carrier and a second component carrier, monitoring a search space configured for scheduling multiple component carriers, receiving, from the base station, DCI including a CIF based on the monitoring, the DCI scheduling a set of data transmissions over two or more component carriers from the set of component carriers, determining that the two component carriers include the first component carrier and the second component carrier based on the monitored search space, the CIF within the DCI, or both, and transmitting or receiving the set of data transmissions over the first component carrier and the second component carrier based on the determining.

A non-transitory computer-readable medium storing code for wireless communication is described. The code may include instructions executable by at least one processor to connect to a base station over a set of component carriers according to a carrier aggregation configuration, the set of component carriers including at least a first component carrier and a second component carrier, monitor a search space configured for scheduling multiple component carriers, receive, from the base station, DCI including a CIF based on the monitoring, the DCI scheduling a set of data transmissions over two or more component carriers from the set of component carriers, determine that the two component carriers include the first component carrier and the second component carrier based on the monitored search space, the CIF within the DCI, or both, and transmit or receive the set of data transmissions over the first component carrier and the second component carrier based on the determining.

Some examples of the method, apparatuses, and non-transitory computer-readable medium described herein may further include operations, features, means, or instructions for receiving, prior to monitoring the search space, configuration information for the search space indicating that the search space may be for scheduling the first component carrier and the second component carrier, where determining that the two or more component carriers include the first component carrier and the second component carrier may be based on the configuration information.

Some examples of the method, apparatuses, and non-transitory computer-readable medium described herein may further include operations, features, means, or instructions for identifying a first value for the CIF indicating the first component carrier based on receiving the configuration information for the search space, and identifying a second value for the CIF indicating the second component carrier based on receiving the configuration information for the search space, where determining that the two or more component carriers include the first component carrier and the second component carrier may be based on the CIF having the first value or the second value.

Some examples of the method, apparatuses, and non-transitory computer-readable medium described herein may further include operations, features, means, or instructions for identifying a value for the CIF indicating the first component carrier and the second component carrier based on receiving the configuration information for the search space, where determining that the two or more component carriers include the first component carrier and the second component carrier may be based on the CIF having the value.

Some examples of the method, apparatuses, and non-transitory computer-readable medium described herein may further include operations, features, means, or instructions for receiving, prior to monitoring the search space, configuration information for the search space indicating that the search space may be configured for scheduling a single component carrier and the multiple component carriers, where monitoring the search space may be based on receiving the configuration information.

In some examples of the method, apparatuses, and non-transitory computer-readable medium described herein, the DCI may be a first DCI and includes the CIF having a first value indicating the multiple component carriers, and determining that the two or more component carriers include the first component carrier and the second component carrier may be based on the CIF having the first value indicating the multiple component carriers.

Some examples of the method, apparatuses, and non-transitory computer-readable medium described herein may further include operations, features, means, or instructions for receiving, a second DCI scheduling a second set of data transmissions over the single component carrier based on monitoring the search space, the second DCI including a second CIF having a second value indicating the single component carrier.

Some examples of the method, apparatuses, and non-transitory computer-readable medium described herein may further include operations, features, means, or instructions for identifying the first value for the CIF indicating the multiple component carriers based on receiving the configuration information for the search space, and identifying a second value for the CIF indicating the single component carrier based on receiving the configuration information for the search space.

In some examples of the method, apparatuses, and non-transitory computer-readable medium described herein, the DCI may be a first DCI and includes the CIF having a value indicating the single component carrier and the multiple component carriers, and determining that the two or more component carriers include the first component carrier and the second component carrier may be based on the CIF having the value indicating the single component carrier and the multiple component carriers.

Some examples of the method, apparatuses, and non-transitory computer-readable medium described herein may further include operations, features, means, or instructions for receiving a second DCI scheduling a second set of data transmissions over the single component carrier based on monitoring the search space, the second DCI including a second CIF having the value indicating the single component carrier and the multiple component carriers.

Some examples of the method, apparatuses, and non-transitory computer-readable medium described herein may further include operations, features, means, or instructions for identifying the value for the CIF indicating the single component carrier and the multiple component carriers based on receiving the configuration information for the search space.

Some examples of the method, apparatuses, and non-transitory computer-readable medium described herein may further include operations, features, means, or instructions for monitoring one or more additional search spaces separate from the search space configured for scheduling multiple component carriers, the one or more additional search spaces configured for scheduling single component carriers, and receiving, from the base station, second DCI scheduling data transmissions over the single component carriers based on monitoring the one or more additional search spaces.

Some examples of the method, apparatuses, and non-transitory computer-readable medium described herein may further include operations, features, means, or instructions for monitoring an additional search space separate from the search space configured for scheduling multiple component carriers, the additional search space configured for a third component carrier and a fourth component carrier different of the set of component carriers, and receiving, from the base station, second DCI scheduling data transmissions over the third component carrier and the fourth component carrier based on monitoring the additional search space.

In some examples of the method, apparatuses, and non-transitory computer-readable medium described herein, receiving the DCI further may include operations, features, means, or instructions for receiving the DCI over a third component carrier from the set of component carriers, where the third component carrier may be different from the first component carrier and the second component carrier.

Some examples of the method, apparatuses, and non-transitory computer-readable medium described herein may further include operations, features, means, or instructions for receiving, from the base station, radio resource control (RRC) signaling indicating a configuration for the search space, where monitoring the search space may be based on receiving the RRC signaling.

A method of wireless communication is described. The method may include connecting with a UE over a set of component carriers according to a carrier aggregation configuration, the set of component carriers including at least a first component carrier and a second component carrier, transmitting, to the UE, configuration information for a search space configured for scheduling multiple component carriers, transmitting DCI including a CIF based on transmitting the configuration information, the DCI scheduling a set of data transmissions over the first component carrier and the second component carrier, where the first component carrier and the second component carrier are indicated from the set of component carriers by the monitored search space, the CIF within the DCI, or both, and transmitting or receiving the set of data transmissions over the first component carrier and the second component carrier based on transmitting the DCI.

An apparatus for wireless communication is described. The apparatus may include at least one processor, memory coupled (e.g., operatively, communicatively, functionally, electronically, electrically) to the at least one processor, and instructions stored in the memory. The instructions may be executable by the at least one processor to cause the apparatus to connect with a UE over a set of component carriers according to a carrier aggregation configuration, the set of component carriers including at least a first component carrier and a second component carrier, transmit, to the UE, configuration information for a search space configured for scheduling multiple component carriers, transmit DCI including a CIF based on transmitting the configuration information, the DCI scheduling a set of data transmissions over the first component carrier and the second component carrier, where the first component carrier and the second component carrier are indicated from the set of component carriers by the monitored search space, the CIF within the DCI, or both, and transmit or receive the set of data transmissions over the first component carrier and the second component carrier based on transmitting the DCI.

Another apparatus for wireless communication is described. The apparatus may include means for connecting with a UE over a set of component carriers according to a carrier aggregation configuration, the set of component carriers including at least a first component carrier and a second component carrier, transmitting, to the UE, configuration information for a search space configured for scheduling multiple component carriers, transmitting DCI including a CIF based on transmitting the configuration information, the DCI scheduling a set of data transmissions over the first component carrier and the second component carrier, where the first component carrier and the second component carrier are indicated from the set of component carriers by the monitored search space, the CIF within the DCI, or both, and transmitting or receiving the set of data transmissions over the first component carrier and the second component carrier based on transmitting the DCI.

A non-transitory computer-readable medium storing code for wireless communication is described. The code may include instructions executable by at least one processor to connect with a UE over a set of component carriers according to a carrier aggregation configuration, the set of component carriers including at least a first component carrier and a second component carrier, transmit, to the UE, configuration information for a search space configured for scheduling multiple component carriers, transmit DCI including a CIF based on transmitting the configuration information, the DCI scheduling a set of data transmissions over the first component carrier and the second component carrier, where the first component carrier and the second component carrier are indicated from the set of component carriers by the monitored search space, the CIF within the DCI, or both, and transmit or receive the set of data transmissions over the first component carrier and the second component carrier based on transmitting the DCI.

In some examples of the method, apparatuses, and non-transitory computer-readable medium described herein, transmitting the configuration information further may include operations, features, means, or instructions for transmitting configuration information for the search space indicating that the search space may be for scheduling the first component carrier and the second component carrier, where indicating the first component carrier and the second component carrier from the set of component carriers may be based on the configuration information.

In some examples of the method, apparatuses, and non-transitory computer-readable medium described herein, the configuration information indicates a first value for the CIF associated with the first component carrier and a second value for the CIF associated with the second component carrier, and indicating the first component carrier and the second component carrier from the set of component carriers may be based on the CIF within the DCI having the first value or the second value.

In some examples of the method, apparatuses, and non-transitory computer-readable medium described herein, the configuration information indicates a value for the CIF associated with the first component carrier and the second component carrier, and indicating the first component carrier and the second component carrier from the set of component carriers may be based on the CIF within the DCI having the value.

In some examples of the method, apparatuses, and non-transitory computer-readable medium described herein, transmitting the configuration information further may include operations, features, means, or instructions for transmitting configuration information for the search space indicating that the search space may be configured for scheduling a single component carrier and the multiple component carriers.

In some examples of the method, apparatuses, and non-transitory computer-readable medium described herein, the DCI may be a first DCI and includes the CIF having a first value indicating the multiple component carriers, and indicating the first component carrier and the second component carrier from the set of component carriers may be based on the CIF having the first value indicating the multiple component carriers.

Some examples of the method, apparatuses, and non-transitory computer-readable medium described herein may further include operations, features, means, or instructions for transmitting, a second DCI scheduling a second set of data transmissions over the single component carrier based on transmitting the configuration information, the second DCI including a second CIF having a second value indicating the single component carrier.

In some examples of the method, apparatuses, and non-transitory computer-readable medium described herein, the configuration information indicates the first value for the CIF associated with the multiple component carriers, and the configuration information indicates a second value for the CIF associated with the single component carrier.

In some examples of the method, apparatuses, and non-transitory computer-readable medium described herein, the DCI may be a first DCI and includes the CIF having a value indicating the single component carrier and the multiple component carriers, and indicating the first component carrier and the second component carrier from the set of component carriers may be based on the CIF having the value indicating the single component carrier and the multiple component carriers.

Some examples of the method, apparatuses, and non-transitory computer-readable medium described herein may further include operations, features, means, or instructions for transmitting, a second DCI scheduling a second set of data transmissions over the single component carrier based on transmitting the configuration information, the second DCI including a second CIF having the value indicating the single component carrier and the multiple component carriers.

In some examples of the method, apparatuses, and non-transitory computer-readable medium described herein, the configuration information indicates the value for the CIF associated with the single component carrier and the multiple component carriers.

Some examples of the method, apparatuses, and non-transitory computer-readable medium described herein may further include operations, features, means, or instructions for transmitting configuration information for one or more additional search spaces separate from the search space configured for scheduling multiple component carriers, the one or more additional search spaces configured for scheduling single component carriers, and transmitting, to the UE, second DCI scheduling data transmissions over the single component carriers based on transmitting the configuration information for the one or more additional search spaces.

Some examples of the method, apparatuses, and non-transitory computer-readable medium described herein may further include operations, features, means, or instructions for transmitting configuration information for an additional search space separate from the search space configured for scheduling multiple component carriers, the additional search space configured for a third component carrier and a fourth component carrier different of the set of component carriers, and transmitting, to the UE, second DCI scheduling data transmissions over the third component carrier and the fourth component carrier based on transmitting the configuration information for the additional search space.

In some examples of the method, apparatuses, and non-transitory computer-readable medium described herein, transmitting the DCI further may include operations, features, means, or instructions for transmitting the DCI over a third component carrier from the set of component carriers, the third component carrier different from the first component carrier and the second component carrier.

In some examples of the method, apparatuses, and non-transitory computer-readable medium described herein, transmitting the configuration information further may include operations, features, means, or instructions for transmitting, to the UE, RRC signaling indicating the configuration information.

DETAILED DESCRIPTION

Figure 1:
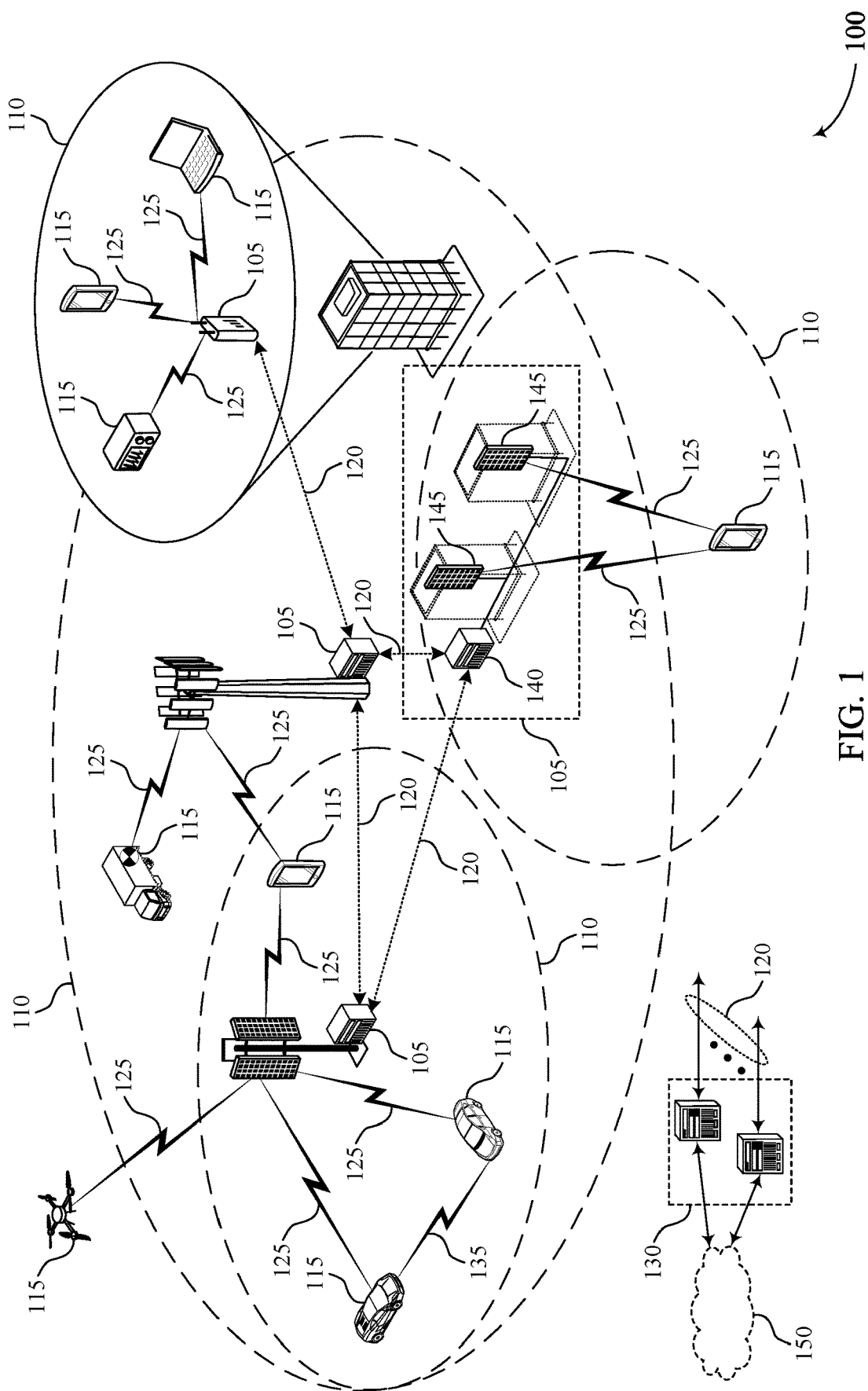
FIG. 1 illustrates an example of a system for wireless communications that supports configuring downlink control information (DCI) to schedule multiple component carriers in accordance with aspects of the present disclosure.

Some wireless communications system may support communication between a user equipment (UE) and a base station on multiple aggregated component carriers, a feature referred to as carrier aggregation. For example, the base station may transmit a same downlink message to the UE across multiple component carriers of a carrier aggregation configuration, such that the UE is able to combine the downlink message received on the multiple component carriers to enhance reliability that the downlink message is successfully received and decoded. In some cases, the base station may transmit separate messages to configure communications on each component carrier of the carrier aggregation configuration. For example, the base station may transmit a first downlink control information (DCI) to configure transmission parameters for a first component carrier, or a second DCI to configure transmission parameters for a second component carrier. However, sending multiple DCIs that use a high amount of resources to indicate the different transmission parameters for each component carrier may increase signaling overhead.

As described herein, the base station may transmit a DCI to schedule data transmissions over more than one component carrier. Thus, a UE may receive a single DCI transmission from the base station, and the single DCI transmission may schedule data transmissions for multiple component carriers. The UE may determine which component carriers (e.g., from a set of component carriers that support communications between the base station and UE) based on a search space associated with the DCI, a value of a carrier indicator field (CIF) within the DCI, or both. For example, a UE may monitor a search space, receive DCI based on monitoring the search space, determine the multiple component carriers being scheduled by the DCI (e.g., based on the monitored search space, a value of a CIF within the DCI, or both), and transmit or receive scheduled data transmissions over the multiple component carriers.

The base station may transmit, to the UE, configuration information for the search space prior to transmitting DCI. The configuration information may indicate an association between the search space and one or more component carriers, an association between a value of the CIF within DCI received by the search space and one or more component carriers, or both. In one example, the base station may configure a search space to be associated with specific component carriers and the UE may determine that DCI received based on monitoring that search space includes scheduling information for data transmissions over the specific component carriers. For example, the configuration information may indicate that a search space is associated with the first and second component carriers. Here, the UE may determine that DCI received based on monitoring that search space schedules a set of data transmissions over the first and second component carriers.

In another example, the base station may configure a search space to be associated with either a single component carrier or multiple component carriers and the UE may determine that DCI received based on monitoring that search space, may schedule data transmissions over the single component carrier or over the multiple component carriers. In some cases, the configuration information may additionally indicate an association between a CIF value within DCI, received based on monitoring that search space, and one or more component carriers. Thus, when the UE receives DCI based on monitoring the search space, the UE may determine whether the DCI schedules data transmissions for the single component carrier or the multiple component carriers based on the value of the CIF within the DCI. For example, the base station may transmit, to the UE, configuration information indicating an association between a first CIF value and a first component carrier. Additionally, the configuration information may indicate an association between a second CIF value and the first and second component carriers. In this example, the UE may determine that DCI that is received based on monitoring the search space and that includes a CIF with the first value schedules data transmissions over the first component carrier. Additionally, the UE may determine that DCI that is received based on monitoring the search space and that includes a CIF with the second value schedules data transmissions over the first and second component carriers.

In either example, the base station may transmit a single DCI for scheduling data transmissions over multiple component carriers. Thus, a control signaling overhead associated with data transmissions over multiple component carriers may be decreased when compared to a base station that transmits multiple DCI transmissions, each scheduling transmissions over a single component carrier.

Aspects of the disclosure are initially described in the context of wireless communications systems. Aspects of the disclosure are subsequently described in the context of component carrier scheduling. Aspects of the disclosure are further illustrated by and described with reference to apparatus diagrams, system diagrams, and flowcharts that relate to configuring DCI to schedule multiple component carriers.

FIG. 1 illustrates an example of a wireless communications system 100 that supports configuring DCI to schedule multiple component carriers in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, an MP3 player, a video device), a camera, a gaming device, a navigation/positioning device (e.g., GNSS (global navigation satellite system) devices based on, for example, GPS (global positioning system), Beidou, GLONASS, or Galileo, a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Additionally, search space sets may include search space sets that are associated with one or more component carriers. That is, control information received by a search space set that is specific to one or more component carriers may schedule data transmissions over the one or more component carriers (or a subset of the one or more component carriers).

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Wireless communications system 100 may support communication between a UE 115 and a base station 105 on multiple aggregated component carriers, a feature referred to as carrier aggregation. In some cases, the base station 105 may transmit separate messages to schedule communications on each component carrier of the carrier aggregation configuration. For example, the base station 105 may transmit a first DCI to schedule data transmissions over a first component carrier, or a second DCI to schedule data transmissions over a second component carrier. However, sending multiple DCIs may be associated with an increased signaling overhead when compared to a base station 105 that sends fewer DCIs.

In some cases, a base station 105 may transmit a single DCI to schedule data transmissions over more than one component carrier. Thus, a UE 115 may receive the single DCI transmission from the base station 105, and the single DCI transmission may schedule data transmissions for multiple component carriers. As described herein, the base station 105 and the UE 115 may use a dynamic spectrum sharing (DSS) configuration as part of an enhancement to enable cross-carrier scheduling such that the single DCI can indicate transmission parameters for multiple CCs at once. For example, as part of the DSS configuration for cross-carrier scheduling, a downlink channel (e.g., a physical downlink control channel (PDCCH)) may be received on a secondary component carrier (SCell) (e.g., or second cell) scheduling a subsequent downlink channel (e.g., PDSCH) or an uplink channel (e.g., physical uplink shared channel (PUSCH) on a primary component carrier (e.g., a primary cell or PCell) or a primary secondary cell (PSCell) (e.g., or a first component carrier). Additionally or alternatively, as part of the DSS configuration for cross-carrier scheduling, a downlink channel (e.g., PDCCH) may be received on a component carrier (e.g., a PCell, PSCell, or SCell) that schedules a subsequent downlink channel (e.g., PDSCH) on multiple component carriers (e.g., multiple component carriers, PCell and SCell) using a single DCI. In some cases, the number of component carriers that can be scheduled at once may be limited to two (2), and the increase in DCI size may be minimized. Additionally, a total downlink channel blind decoding budget (e.g., PDCCH blind decoding budget) may not be affected with the single DCI. In some cases, these enhancements may not be specific to DSS and may be generally applicable to cross-carrier scheduling in carrier aggregation.

The UE 115 may determine which component carriers (e.g., from a set of component carriers that support communications between the base station 105 and UE 115) based on a search space associated with the DCI, a value of a CIF within the DCI, or both. For example, a UE 115 may monitor a search space, receive DCI based on monitoring the search space, determine the multiple component carriers being scheduled by the DCI (e.g., based on the monitored search space, a value of a CIF within the DCI, or both), and transmit or receive scheduled data transmissions over the multiple component carriers.

The base station 105 may transmit, to the UE 115, configuration information for the search space prior to transmitting DCI. The configuration information may indicate an association between the search space and one or more component carriers, an association between a value of the CIF within DCI received by the search space and one or more component carriers, or both. In one example, the base station 105 may configure a search space to be associated with specific component carriers. Here, the UE 115 may determine that DCI received based on monitoring that search space includes scheduling information for data transmissions over the specific component carriers. That is, the configuration information may indicate that a search space is associated with the first and second component carriers. Thus, the UE 115 may determine that DCI received based on monitoring that search space, schedules a set of data transmissions over the first and second component carriers.

In another example, the base station 105 may configure a search space to be associated with either a single component carrier or multiple component carriers. Here, the UE 115 may determine that DCI, received based on monitoring that search space, may schedule data transmissions over the single component carrier or over the multiple component carriers. In some cases, the configuration information may additionally indicate an association between a CIF value within DCI, received based on monitoring that search space, and one or more component carriers. Thus, when the UE 115 receives DCI based on monitoring the search space, the UE 115 may determine whether the DCI schedules data transmissions for the single component carrier or the multiple component carriers based on the value of the CIF within the DCI. For example, the base station 105 may transmit, to the UE 115, configuration information indicating an association between a first CIF value and a first component carrier. Additionally, the configuration information may indicate an association between a second CIF value and the first and second component carriers. In this example, the UE 115 may determine that DCI that is received based on monitoring the search space and that includes a CIF with the first value schedules data transmissions over the first component carrier. Additionally, the UE 115 may determine that DCI that is received based on monitoring the search space and that includes a CIF with the second value schedules data transmissions over the first and second component carriers.

In either example, the base station 105 may transmit a single DCI for scheduling data transmissions over multiple component carriers. Thus, a control signaling overhead associated with data transmissions over multiple component carriers may be decreased when compared to a base station 105 that transmits multiple DCI transmissions, each scheduling transmissions over a single component carrier.

Figure 2:
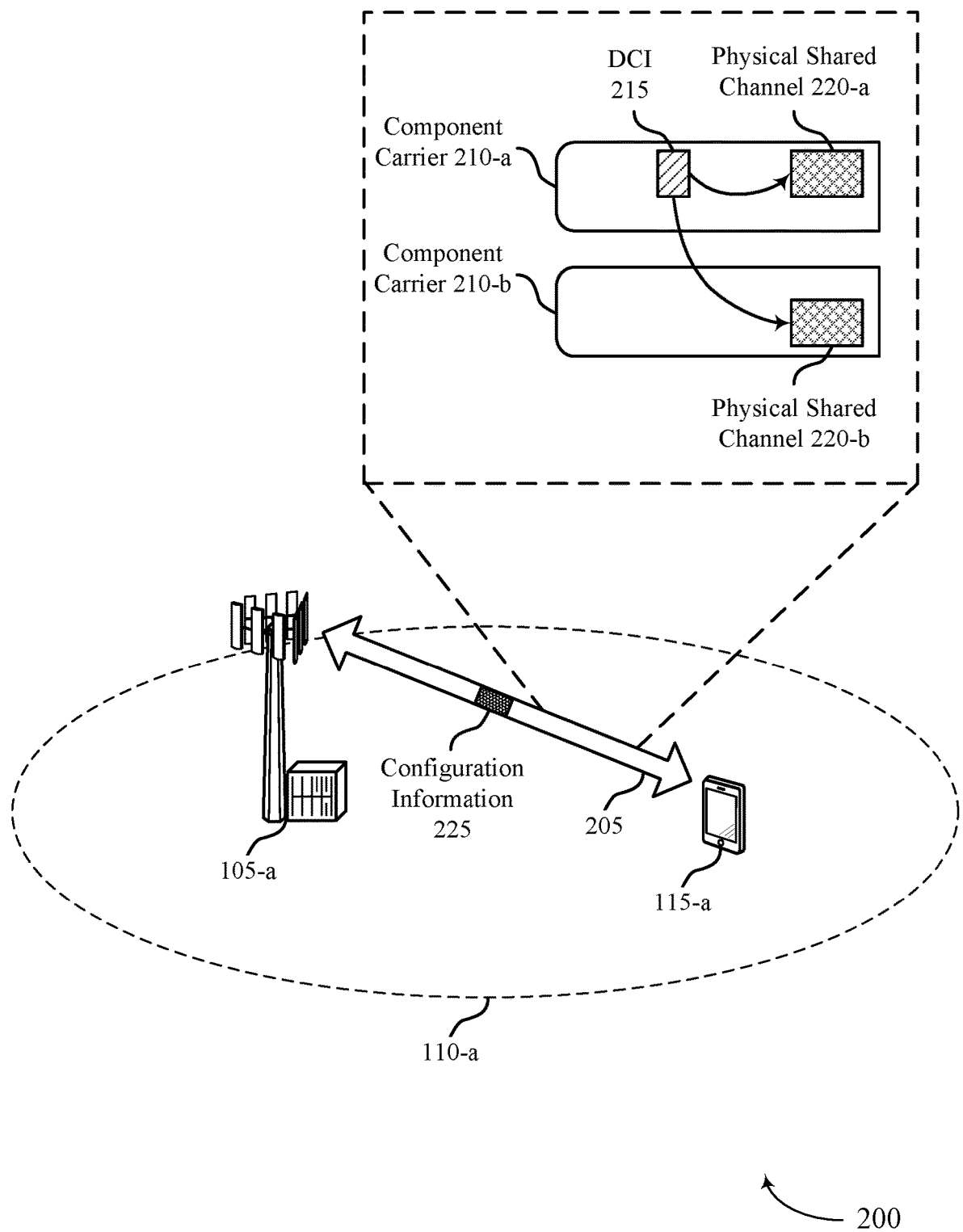
FIG. 2 illustrates an example of a wireless communications system that supports configuring DCI to schedule multiple component carriers in accordance with aspects of the present disclosure.

FIG. 2 illustrates an example of a wireless communications system 200 that supports configuring DCI to schedule multiple component carriers in accordance with aspects of the present disclosure. In some examples, the wireless communications system 200 may include a base station 105-a and a UE 115-a, which may be examples of a base station 105 and a UE 115 as described with reference to FIG. 1. Base station 105-a may serve a geographic coverage area 110-a. In some cases, base station 105-a may schedule data transmissions over multiple component carriers by a single DCI 215.

The UE 115-a may establish a communication link 205 with the base station 105-a over a set of component carriers 210 including at least a first component carrier 210-a and a second component carrier 210-b. In some cases, the component carrier 210-a may correspond to a non-DSS SCell and the component carrier 210-b may correspond to a DSS PCell. For example, the component carrier 210-a may support medium to high frequency bands (e.g., 3.5 GHz, 4.7 GHz) and the component carrier 210-b may support lower frequency bands (e.g., 2 GHz). In some other cases, the first component carrier 210-a and the second component carrier 210-b may correspond to other types of cells.

The base station 105-a may transmit configuration information 225 to the UE 115-a to configure one or more search spaces for receiving DCI 215. Each search space may correspond to a set of time or frequency resources that a UE 115-a is configured to monitor to receive DCI 215 scheduling data transmissions over one or more physical shared channels 220 (e.g., a PDSCH, a PUSCH). The base station 105-a may transmit the configuration information 225 (e.g., by RRC signaling, by a MAC control element (MAC-CE)) to the UE 115-a by the communication link 205. For example, the base station 105-a may transmit the configuration information 225 to the UE 115-a by the first component carrier 210-a. Additionally, the base station 105-a may transmit the configuration information 225 to the UE 115-a by the second component carrier 210-b. The configuration information 225 may indicate one or more search space configurations for the UE 115-a to receive DCI 215 scheduling data transmissions over the component carrier 210-a, the component carrier 210-b, or both. In some cases, the configuration information 225 may include distinct parameters for each component carrier 210. For example, the configuration information 225 may indicate, to the UE 115-*a*, one or more search spaces for receiving DCI 215 scheduling data transmissions over the component carrier 210-*a*. Additionally, the configuration information 225 may indicate, to the UE 115-*a*, one or more search spaces for receiving DCI 215 scheduling data transmissions over the component carrier 210-*b*. In some cases, the search space for receiving data transmissions over the component carrier 210-*a* and the component carrier 210-*b* may be the same.

For each component carrier 210, the configuration information 225 may indicate one or more parameters to the UE 115-*a* associated with the search space. For example, the configuration information 225 may indicate whether the component carrier 210 is self-scheduled or cross-scheduled. If a component carrier 210 is self-scheduled, the UE 115-*a* may monitor the component carrier 210 to receive DCI 215 scheduling data transmissions on that component carrier 210. Additionally, if a component carrier 210 is cross-scheduled, the UE 115-*a* may monitor a different component carrier 210 to receive DCI scheduling data transmissions on that component carrier 210. Here, the configuration information 225 may indicate that the component carrier 210-*a* is self-scheduled (e.g., by including a parameter 'schedulingCellInfo' indicating 'own' in the configuration information 225). Additionally, the configuration information 225 may indicate that the component carrier 210-*b* is cross-scheduled (e.g., by including a parameter 'schedulingCellInfo' indicating 'other' in the configuration information 225). In another example, the configuration information 225 may indicate whether the DCI 215 that schedules data transmissions for that component carrier 210 has a CIF (e.g., based on a Boolean value indicated by a 'cif-Presence' parameter) and, in some cases, a CIF value associated with the component carrier 210. For example, the configuration information 225 may indicate that DCI 215 associated with the component carrier 210-*b* may include a CIF having a value '1' (e.g., by setting parameter 'cif-InSchedulingCell' to '1').

The configuration information 225 may additionally indicate a search space identifier (e.g., by a 'searchSpaceId' parameter), a quantity of candidate resource sets associated with the search space (e.g., by a 'nrofCandidates' parameter), a set of resources associated with the search space (e.g., by a 'monitoringSlotPeriodicityAndOffsetduration' parameter, by a 'monitoringSymbolsWithinSlot' parameter'), an identifier of an associated CORSET (e.g., by a 'controResourceSetId' parameter), and a type of search space (e.g., by a 'searchSpaceType' parameter). In some cases, if a component carrier 210 is self-scheduled (e.g., component carrier 210-*a*), the configuration information 225 may indicate a full configuration of the search space. Additionally, if a component carrier 210 is cross-scheduled, (e.g., component carrier 210-*b*), the configuration information 225 may indicate a search space identifier to the UE 115-*a*, and the UE 115-*a* may determine the search space configuration based on the parameters indicated by the configuration information 225 for the self-scheduled component carrier 210.

In the example of wireless communications system 200, the configuration information 225 may indicate a search space that is configured for scheduling multiple component carriers 210. That is, the base station 105-*a* may indicate, by the configuration information 225, a search space for receiving DCI 215 that schedules data transmissions for the component carriers 210-*a* and 210-*b*. Based on receiving the configuration information 225 from the base station 105-*a*, the UE 115-*a* may monitor the search space and receive the DCI 215. The DCI 215 may schedule data transmissions for two or more component carriers 210 (e.g., including at least component carriers 210-*a* and 210-*b*).

The UE 115-*a* may determine which component carriers 210 are scheduled by the DCI 215 based on the monitored search space, a value of the CIF within the DCI 215, or both. In a first example, the UE 115-*a* may determine that the DCI 215 schedules data transmissions over the physical shared channels 220-*a* and 220-*b* based on the monitored search space being associated with the component carriers 210-*a* and 210-*b*. That is, the configuration information 225 may indicate that DCI 215 received by the monitored search space schedules transmissions by the physical shared channels 220-*a* and 220-*b*. In a second example, the UE 115-*a* may receive the DCI 215 based on monitoring a search space that is associated with transmissions over the physical shared channel 220-*a*, the physical shared channel 220-*b*, or both. Here, the UE 115-*a* may determine that the DCI 215 schedules data transmissions over the physical shared channels 220-*a* and 220-*b* based on a value of the CIF within the DCI 215. That is, the configuration information 225 may indicate an association between the value of the CIF within the DCI 215 and the component carrier 210-*a* and 210-*b*.

In either case, the UE 115-*a* may determine that the DCI 215 schedules transmissions over the physical shared channel 220-*a* and the physical shared channel 220-*b*. The UE 115-*a* may then receive and transmit data transmissions by the physical shared channel 220 in accordance with the scheduling information indicated by the DCI 215. In some cases, the physical shared channel 220 on each of the component carriers 210 may be associated with a single physical shared channel. That is, a carrier aggregation configuration associated with the communication link 205 may indicate that the UE 115-*a* is able to combine a downlink message received on the multiple component carriers 210 to enhance reliability that the downlink message is successfully received and decoded. In some other cases, the physical shared channel 220 on the component carrier 210-*a* may be distinct from a physical shared channel 220 on the component carrier 210-*b*.

Figure 3:
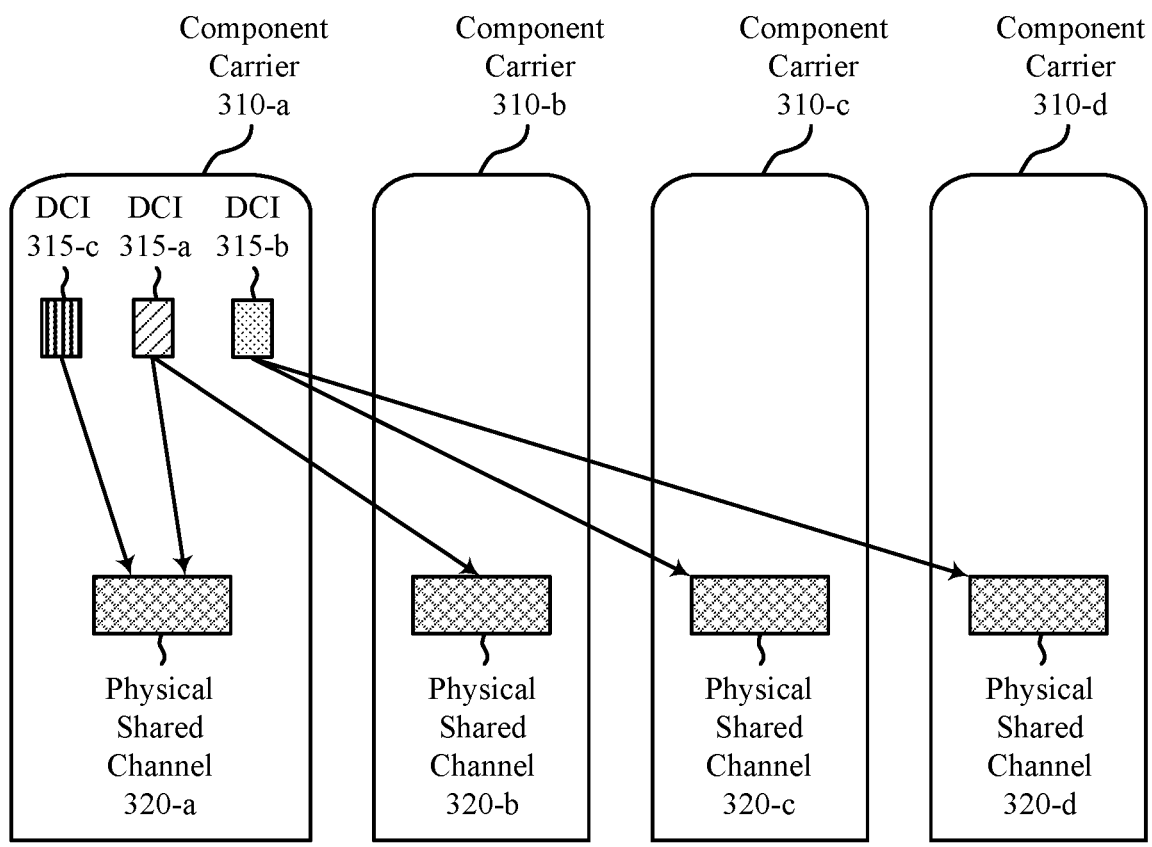
FIGS. 3 through 5 illustrate examples of component carrier scheduling that supports configuring DCI to schedule multiple component carriers in accordance with aspects of the present disclosure.

FIG. 3 illustrates an example of a component carrier scheduling 300 that supports configuring DCI to schedule multiple component carriers in accordance with aspects of the present disclosure. In some examples, component carrier scheduling 300 may implement aspects as described with reference to FIGS. 1 and 2. For example, the component carrier scheduling 300 may illustrate DCI 315 that schedules physical shared channel transmissions 320 over multiple component carriers 310 as described with reference to FIGS. 1 and 2.

In the example of component carrier scheduling 300, a UE may determine which component carriers 310 are scheduled by the DCI 315 based on the search space 305 associated with the DCI 315. For example, the search space 305-*a* may be associated with the component carrier 310-*a* and the component carrier 310-*b*. Additionally, the search space 305-*b* may be associated with the component carrier 310-*c* and the component carrier 310-*d*. In some cases, a UE may receive DCI 315-*a* based on monitoring the first search space 305-*a* and may determine that the DCI 315-*a* schedules data transmissions over the component carrier 310-*a* and the component carrier 310-*b* based on the search space 305-*a* being associated with the component carrier 310-*a* and the component carrier 310-*b*. Additionally, the UE may receive the DCI 315-*b* based on monitoring a second search space 305-*b* and may determine that the DCI 315-*b* schedules data transmissions over the component carrier 310-*c* and the component carrier 310-*d* based on the search space 305-*b* being associated with the component carrier 310-*c* and the component carrier 310-*d*. In some cases, additional search spaces 305 may be configured for scheduling single component carrier 310 transmissions (e.g., the third search space 305-*c*). Here, the UE may additionally monitor the third search space 305-*c* (e.g., based on receiving configuration information associated with that search space). If the UE receives DCI 315 based on monitoring that search space 305, the UE may determine that a single component carrier 310 is being scheduled by that DCI 315. For example, a UE may receive DCI 315-*c* based on monitoring the third search space 305-*c* and may determine that the DCI 315-*c* schedules data transmissions over the component carrier 310-*a* based on the search space 305-*c* being associated with the single component carrier 310-*a*. The DCI 315 received based on monitoring a search space 305 associated with a single component carrier 310 may cross-schedule or self-schedule data transmissions over the single component carrier 310.

To configure the search spaces 305, a base station may transmit configuration information (e.g., by RRC signaling) to the UE by one or more of the component carriers 310-*a*, 310-*b*, 310-*c*, and 310-*d*. The configuration information may indicate, for each of the component carriers 310, whether that component carrier is self-scheduled or cross-scheduled (e.g., by a 'schedulingCellinfo' parameter). Here, configuration information may indicate the component carrier 310-*a* is self-scheduled and that each of the component carriers 310-*b*, 310-*c*, and 310-*d* are cross-scheduled. The configuration information may additionally indicate a scheduling cell identifier. For example, the component carrier 310-*a* may be indicated by an identifier of '0.' Here, a parameter indicating the scheduling cell identifier (e.g., a 'schedulingCellId' parameter) may indicate '0' for each of the component carriers 310-*b*, 310-*c*, and 310-*d*.

Additionally, the configuration information may indicate, for each search space, which component carriers 310 may be scheduled by DCI received based on monitoring that search space. For example, the configuration information may indicate component carriers 310-*a* and 310-*b* for the first search space 305-*a*. That is, the configuration information for the component carriers 310-*a* and 310-*b* may indicate a search space identifier associated with the search space 305-*a*. Additionally, the configuration information may indicate component carriers 310-*c* and 310-*d* for the second search space 305-*b*. That is, the configuration information for the component carriers 310-*c* and 310-*d* may indicate a search space identifier associated with the search space 305-*b*. Additionally, the configuration information may indicate a single component carrier 310-*a* for the third search space 305-*c*. That is, the configuration information for the component carrier 310-*a* may indicate a search space identifier associated with the search space 305-*c*.

Table 1, shown below, illustrates example parameters within the configuration information associated with each component carrier 310 to configure the search spaces 305 such that a UE may receive the DCI 315 and receive and transmit physical shared channel transmissions 320 scheduled by each DCI 315.

TABLE 1

| Configuration Parameters for Dedicated Search Spaces | | | | |
|---|---|---|---|---|
| | Component Carrier 310-a | Component Carrier 310-b | Component Carrier 310-c | Component Carrier 310-d |
| schedulingCellinfo | own | other | other | other |
| Cif-Presence | BOOLEAN | | | |
| schedulingCellId | | 0 | 0 | 0 |
| Cif-InSchedulingCell | | 1 | 2 | 3 |

Table 1 illustrates that the configuration information for the component carrier 310-*a* may indicate that the component carrier 310-*a* is self-scheduled (e.g., by the 'schedulingCellinfo' parameter indicating 'own') and may not include a CIF (e.g., by the 'Cif-Presence' parameter indicating 'BOOLEAN'). Additionally, Table 1 illustrates that the configuration information for the component carrier 310-*b* may indicate that the component carrier 310-*b* is cross-scheduled (e.g., by the 'schedulingCellinfo' parameter indicating 'other') by component carrier 310-*a* (e.g., by the 'schedulingCellId' parameter indicating '0'), and may include a CIF with a value of '1' (e.g., by the 'Cif-InSchedulingCell' parameter indicating '1'). Thus, the DCI 315-*a* received based on monitoring the first search space 305-*a* may include no CIF or a CIF having a value '1' and schedules transmissions over the component carriers 310-*a* and 310-*b*.

Table 1 additionally illustrates that the configuration information for the component carrier 310-*c* may indicate that the component carrier 310-*c* is cross-scheduled (e.g., by the 'schedulingCellinfo' parameter indicating 'other') by component carrier 310-*a* (e.g., by the 'schedulingCellId' parameter indicating '0'), and may include a CIF with a value of '2' (e.g., by the 'Cif-InSchedulingCell' parameter indicating '1'). Additionally, Table 1 illustrates that the configuration information for the component carrier 310-*d* may indicate that the component carrier 310-*d* is cross-scheduled (e.g., by the 'schedulingCellinfo' parameter indicating 'other') by component carrier 310-*a* (e.g., by the 'schedulingCellId' parameter indicating '0'), and may include a CIF with a value of '3' (e.g., by the 'Cif-InSchedulingCell' parameter indicating '1'). Thus, the DCI 315-*b* received based on monitoring the second search space 305-*b* may include a CIF having a value '2' or '3' and schedules transmissions over the component carriers 310-*c* and 310-*d*.

Figure 4:
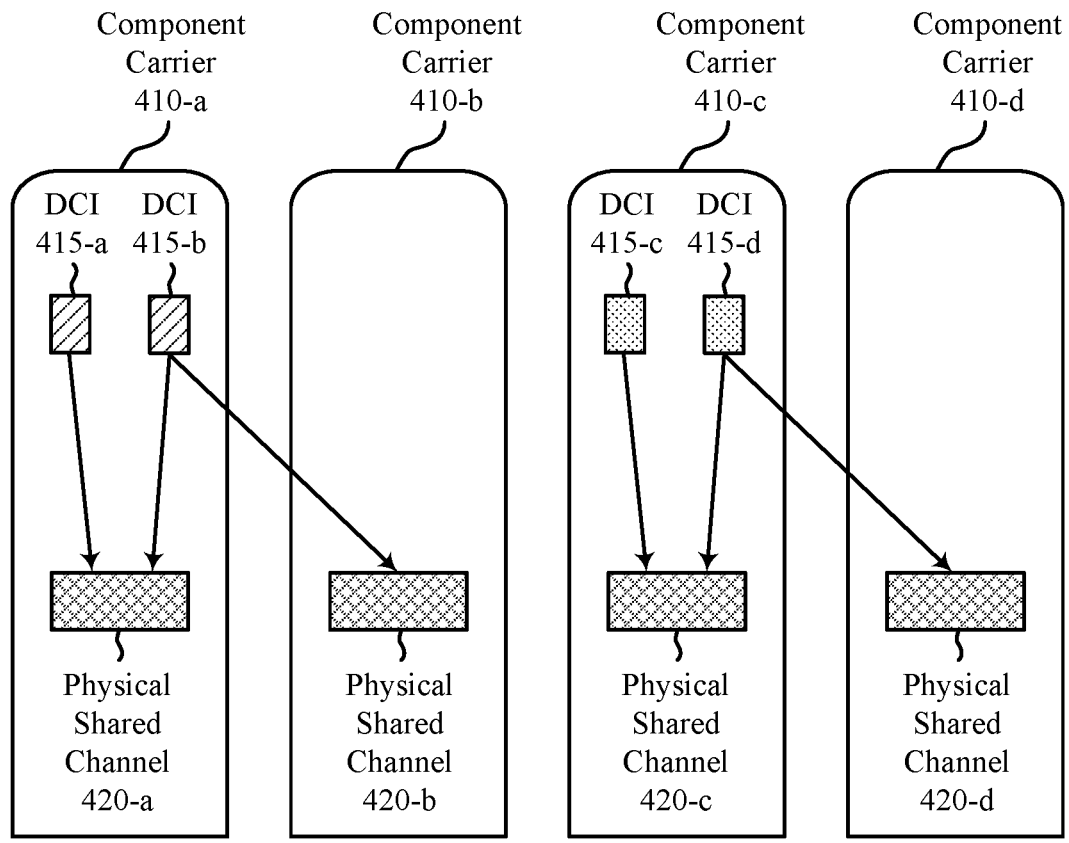

FIG. 4 illustrates an example of a component carrier scheduling 400 that supports configuring DCI to schedule multiple component carriers in accordance with aspects of the present disclosure. In some examples, component carrier scheduling 400 may implement aspects as described with reference to FIGS. 1 through 3. For example, the component carrier scheduling 400 may illustrate DCI 415 that schedules physical shared channel transmissions 420 over multiple component carriers 410 as described with reference to FIGS. 1 and 2.

In the example of component carrier scheduling 400, each of the DCIs 415 may be received based on monitoring a single search space that is configured for scheduling data transmissions over a single component carrier 410 and multiple component carriers 410. That is, each of the DCIs 415 may be associated with the same search space. Here, a UE may determine which component carriers 410 are scheduled by the DCI 415 based on a value of the CIF within the DCI 415. For example, DCIs 415 having a first CIF value 405-a (e.g., DCI 415-a and DCI 415-b) may be associated with the component carrier 410-a, component carrier 410-b, or both. In some cases, the first CIF value 405-a may indicate a value within the CIF of the DCI 415-a and 415-b. In some other cases, the first CIF value 405-a may indicate an absence of the CIF within the DCI 415-a and 415-b. Additionally, DCIs 415 having a second CIF value 405-b (e.g., DCI 415-c and DCI 415-d) may be associated with the component carrier 410-c, the component carrier 410-d, or both.

A UE may receive DCI 415-a based on monitoring a search space and may determine that the DCI 415-a schedules data transmissions over the component carrier 410-a based on the DCI 415-a having the first CIF value 405-a. Additionally, the UE may receive DCI 415-b based on monitoring the search space and may determine that the DCI 415-b schedules data transmissions over the component carrier 410-a and 410-b based on the DCI 415-b having the first CIF value 405-a. The UE may receive the DCI 415-c and 415-d based on monitoring the search space. Here, the UE may determine that the DCI 415-c schedules data transmissions over the component carrier 410-c based on the DCI 415-c having the second CIF value 405-b. Additionally, the UE may determine that the DCI 415-d schedules data transmissions over the component carrier 410-c and the component carrier 410-d based on the DCI 415-d having the second CIF value 405-b.

To configure the search spaces, a base station may transmit configuration information (e.g., by RRC signaling) to the UE by one or more of the component carriers 410-a, 410-b, 410-c, and 410-d. The configuration information may indicate, for each of the component carriers 410, whether that component carrier is self-scheduled or cross-scheduled (e.g., by a 'schedulingCellinfo' parameter). Here, configuration information may indicate the component carriers 410-a and 410-c are self-scheduled and that component carriers 410-b and 410-d are cross-scheduled. The configuration information may additionally indicate a scheduling cell identifier. For example, the component carrier 410-a may be indicated by an identifier of '0.' Thus, a parameter indicating the scheduling cell identifier (e.g., a 'schedulingCellId' parameter) may indicate '0' for the component carrier 410-b. Additionally, the component carrier 410-c may be indicated by an identifier of '2.' Thus, a parameter indicating the scheduling cell identifier (e.g., a 'schedulingCellId' parameter) may indicate '2' for the component carrier 410-d.

Table 2, shown below, illustrates example parameters within the configuration information associated with each component carrier 410 to configure the search space such that a UE may receive the DCI 415 and receive and transmit physical shared channel transmissions 420 scheduled by each DCI 415.

TABLE 2

Configuration Parameters for Single Search Space

| | Component Carrier 410-a | Component Carrier 410-b | Component Carrier 410-c | Component Carrier 410-d |
|---|---|---|---|---|
| schedulingCellinfo | own | other | own | other |
| Cif-Presence | BOOLEAN | BOOLEAN | | |
| schedulingCellId | | 0 | 2 | 2 |
| Cif-InSchedulingCell | | | 3 | 3 |

Table 2 illustrates that the configuration information for the component carrier 410-a may indicate that the component carrier 410-a is self-scheduled (e.g., by the 'schedulingCellinfo' parameter indicating 'own') and may not include a CIF (e.g., by the 'Cif-Presence' parameter indicating 'BOOLEAN'). Additionally, Table 2 illustrates that the configuration information for the component carrier 410-b may indicate that the component carrier 410-b is cross-scheduled (e.g., by the 'schedulingCellinfo' parameter indicating 'other') by component carrier 410-a (e.g., by the 'schedulingCellId' parameter indicating '0'), and may not include a CIF (e.g., by the 'Cif-Presence' parameter indicating 'BOOLEAN'). Thus, the DCI 415-a and the DCI 415-b have the first CIF value 405-a (e.g., an absence of a CIF within the DCI 415-a and 415-b) and schedule transmissions over the component carrier 410-a, the component carrier 410-b, or both.

Table 2 additionally illustrates that the configuration information for the component carrier 410-c may indicate that the component carrier 410-c is self-scheduled (e.g., by the 'schedulingCellinfo' parameter indicating 'own') and may include a CIF having a value '3' (e.g., by the 'Cif-InSchedulingCell' parameter indicating '3'). Additionally, Table 2 illustrates that the configuration information for the component carrier 410-d may indicate that the component carrier 410-d is cross-scheduled (e.g., by the 'schedulingCellinfo' parameter indicating 'other') by component carrier 410-c (e.g., by the 'schedulingCellId' parameter indicating '2'), and may include a CIF having a value '3' (e.g., by the 'Cif-InSchedulingCell' parameter indicating '3'). Thus, the DCI 415-c and the DCI 415-d have the second CIF value 405-b (e.g., a value of '3') and schedule transmissions over the component carrier 410-c, the component carrier 410-d, or both.

Figure 5:
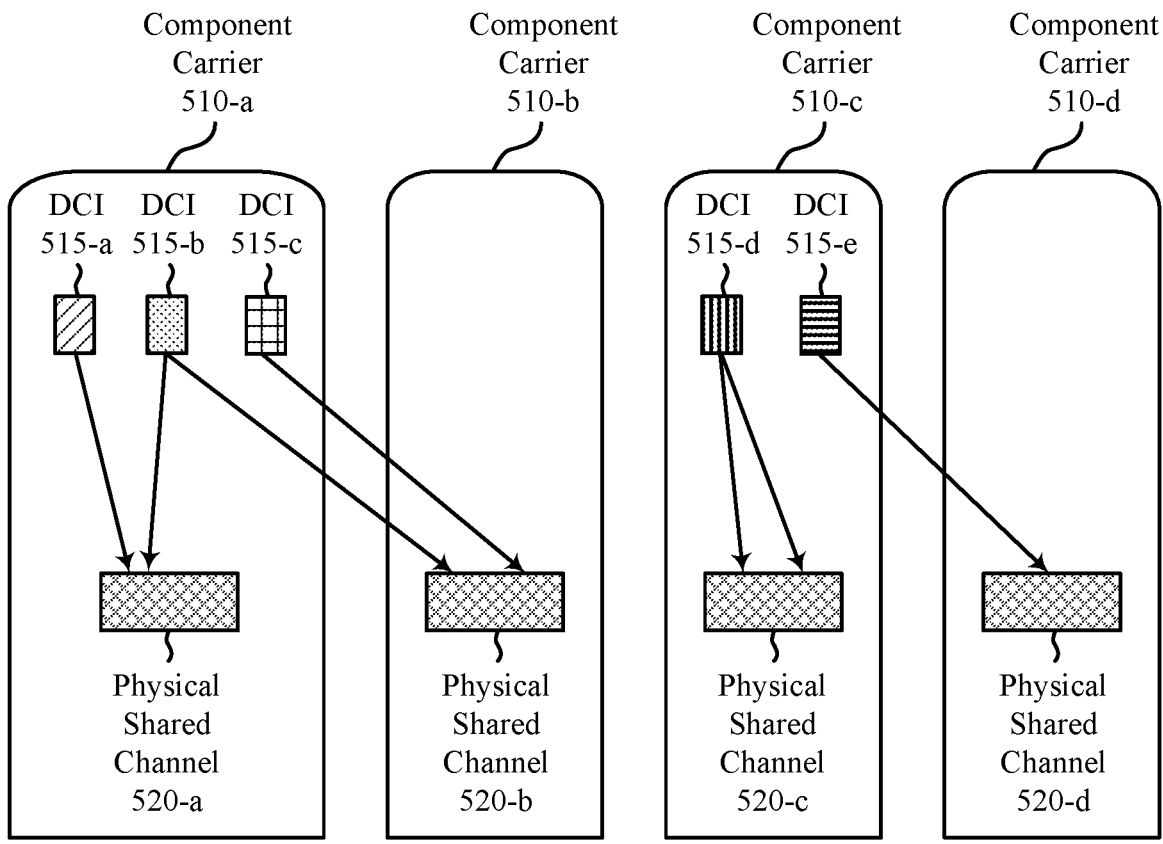

FIG. 5 illustrates an example of a component carrier scheduling 500 that supports configuring DCI to schedule multiple component carriers in accordance with aspects of the present disclosure. In some examples, component carrier scheduling 500 may implement aspects as described with reference to FIGS. 1 through 4. For example, the component carrier scheduling 500 may illustrate DCI 515 that schedules physical shared channel transmissions 520 over multiple component carriers 510 as described with reference to FIGS. 1 and 2.

In the example of component carrier scheduling 500, a UE may determine which component carriers 510 are scheduled by the DCI 515 based on a CIF value 505 within the DCI 515. For example, DCIs 515 having a first CIF value 505-a (e.g., DCI 515-a) may be associated with the component carrier 510-a, DCIs 515 having a second CIF value 505-b (e.g., DCI 515-b) may be associated with the component carrier 510-a and component carrier 510-b, DCIs 515 having a third CIF value 505-c (e.g., DCI 515-c) may be associated with the component carrier 510-b, DCIs 515 having a fourth CIF value 505-d (e.g., DCI 515-a) may be associated with the component carrier 510-c, and DCIs 515 having a fifth CIF value 505-e (e.g., DCI 515-e) may be associated with the component carrier 510-c and the component carrier 510-d.

In some cases, a UE may receive DCI 515 based on monitoring a single search space. That is, each of the DCIs 515 may be associated with a single search space. In some other cases, a UE may receive DCI 515 by monitoring multiple search spaces. For example, the UE may receive configuration information indicating a set of search spaces, each associated with one or more component carriers 510. Here, the UE may monitor a search space associated with one or more component carriers 510 and receive DCI 515 scheduling physical shared channel transmissions 520 over the one or more component carriers 510. That is, the UE may monitor a first search space associated with the component carrier 510-a to receive the DCI 515-a, the UE may monitor a second search space associated with the component carrier 510-a and the component carrier 510-b to receive the DCI 515-b, the UE may monitor a third search space associated with the component carrier 510-b to receive the DCI 515-c, the UE may monitor a fourth search space associated with the component carrier 510-c to receive the DCI 515-d, and the UE may monitor a fifth search space associated with the component carrier 510-c and the component carrier 510-d to receive the DCI 515-e.

To configure the search spaces, a base station may transmit configuration information (e.g., by RRC signaling) to the UE by one or more of the component carriers 510-a, 510-b, 510-c, and 510-d. The configuration information may indicate, for each of the component carriers 510, whether that component carrier is self-scheduled or cross-scheduled (e.g., by a 'schedulingCellinfo' parameter). Here, configuration information may indicate the component carriers 510-a and 510-c are self-scheduled and that component carriers 510-b and 510-d are cross-scheduled. The configuration information may additionally indicate a scheduling cell identifier. For example, the component carrier 510-a may be indicated by an identifier of '0.' Thus, a parameter indicating the scheduling cell identifier (e.g., a 'schedulingCellId' parameter) may indicate '0' for the component carrier 510-b. Additionally, the component carrier 510-c may be indicated by an identifier of '2.' Thus, a parameter indicating the scheduling cell identifier (e.g., a 'schedulingCellId' parameter) may indicate '2' for the component carrier 510-d. Additionally, the configuration information may additionally indicate a CIF value within DCI 515 that schedules multiple component carriers 510 (e.g., by a 'cif-InSchedulingCellMultiCC' parameter). That is, the configuration information may indicate a first CIF value for DCI 515 that schedules data transmissions over the single component carrier 510 and a different CIF value for DCI 515 that schedules data transmissions over the multiple component carriers 510.

Table 3, shown below, illustrates example parameters within the configuration information associated with each component carrier 510 to configure one or more search spaces such that a UE may receive the DCI 515 and receive and transmit physical shared channel transmissions 520 scheduled by each DCI 515.

TABLE 3

Configuration Parameters for Dedicated CIF Values

| | Component Carrier 410-a | Component Carrier 410-b | Component Carrier 410-c | Component Carrier 410-d |
|---|---|---|---|---|
| schedulingCellinfo | own | other | own | other |
| Cif-Presence | BOOLEAN | | | |
| schedulingCellId | | 0 | | 2 |
| Cif-InSchedulingCell | | 1 | | 3 |
| Cif-InSchedulingMultiCC | 4 | 4 | 5 | 5 |

Table 3 illustrates that the configuration information for the component carrier 510-a may indicate that the component carrier 510-a is self-scheduled (e.g., by the 'schedulingCellinfo' parameter indicating 'own'), may not include a CIF for DCI scheduling the single component carrier 510-a (e.g., by the 'Cif-Presence' parameter indicating 'BOOLEAN'), and may include a CIF having a value of '4' for DCI scheduling multiple component carriers 510 (e.g., by the 'cif-InSchedulingCellMultiCC' parameter indicating '4'). Additionally, Table 3 illustrates that the configuration information for the component carrier 510-b may indicate that the component carrier 510-b is cross-scheduled (e.g., by the 'schedulingCellinfo' parameter indicating 'other') by component carrier 510-a (e.g., by the 'schedulingCellId' parameter indicating '0'), may include a CIF having a value '1' for DCI scheduling the single component carrier 510-b (e.g., by the 'Cif-InSchedulingCell' parameter indicating '1'), and may include a CIF having a value of '4' for DCI scheduling multiple component carriers 510 (e.g., by the 'cif-InSchedulingCellMultiCC' parameter indicating '4'). Thus, the DCI 515-a may have a first CIF value 505-a (e.g., an absence of the CIF within the DCI 515-a) and may schedule transmissions over the component carrier 510-a, the DCI 515-b may have a second CIF value 505-b of '4' and may schedule transmissions over the component carrier 510-a and the component carrier 510-b, and the DCI 515-c may have a third CIF value 505-c of '1' and may schedule transmissions over the component carrier 510-b.

Table 3 additionally illustrates that the configuration information for the component carrier 510-c may indicate that the component carrier 510-c is self-scheduled (e.g., by the 'schedulingCellinfo' parameter indicating 'own'), and may include a CIF having a value of '5' for DCI scheduling multiple component carriers 510 (e.g., by the 'cif-InSchedulingCellMultiCC' parameter indicating '5'). Additionally, Table 3 illustrates that the configuration information for the component carrier 510-d may indicate that the component carrier 510-d is cross-scheduled (e.g., by the 'schedulingCellinfo' parameter indicating 'other') by component carrier 510-c (e.g., by the 'schedulingCellId' parameter indicating '0'), may include a CIF having a value '3' for DCI scheduling the single component carrier 510-d (e.g., by the 'Cif-InSchedulingCell' parameter indicating '1'), and may include a CIF having a value of '5' for DCI scheduling multiple component carriers 510 (e.g., by the 'cif-InSchedulingCellMultiCC' parameter indicating '5'). Thus, the DCI 515-d may have a fourth CIF value 505-b of '5' and may schedule transmissions over the component carrier 510-c and the component carrier 510-c, and the DCI 515-e may have a fifth CIF value 505-e of '3' and may schedule transmissions over the component carrier 510-d.

Figure 6:
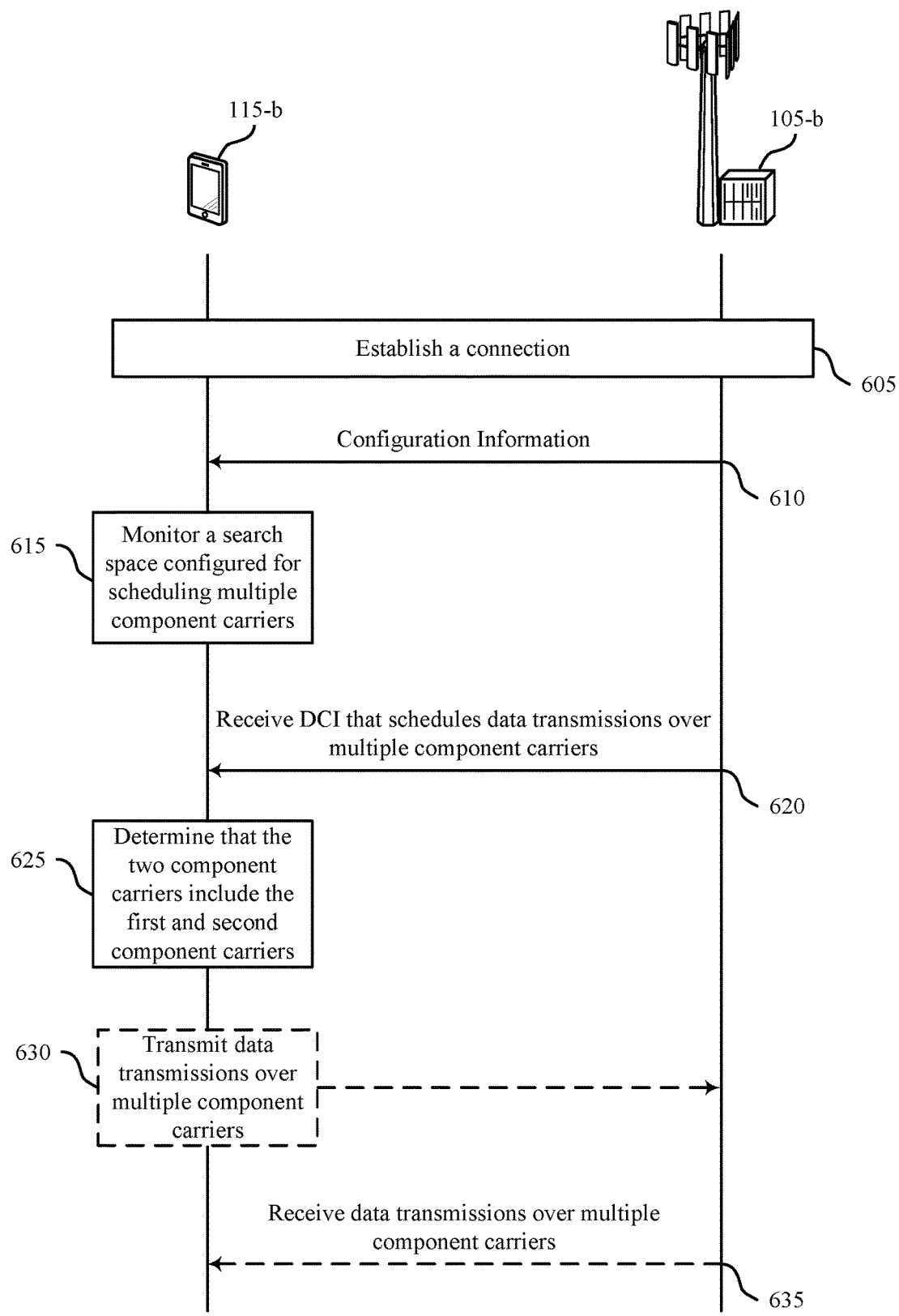
FIG. 6 illustrates an example of a process flow that supports configuring DCI to schedule multiple component carriers in accordance with aspects of the present disclosure.

FIG. 6 illustrates an example of a process flow 600 that supports configuring DCI to schedule multiple component carriers in accordance with aspects of the present disclosure. In some examples, the process flow 600 may implement aspects as described with reference to FIGS. 1 through 5. For example, UE 115-b and base station 105-b may be an example of a UE 115 and a base station 105, respectively, as described with reference to FIGS. 1 and 2. Additionally, the base station 105-b may implement a component carrier scheduling as described with reference to FIGS. 3 through 5 to schedule data transmissions over multiple component carriers by a single DCI.

At 605, the base station 105-b and the UE 115-b may establish a connection over a set of component carriers according to a carrier aggregation configuration. In some cases, the set of component carriers may include at least a first component carrier and a second component carrier.

At 610, the base station 105-b may transmit configuration information (e.g., by RRC signaling, by a MAC-CE) to the UE 115-*b*. In some cases, the configuration information may indicate a search space configuration for receiving one or more DCI transmissions.

At 615, the UE 115-*b* may monitor a search space (e.g., based on receiving the configuration information) configured for scheduling multiple component carriers.

At 620, the UE 115-*b* may receive DCI that schedules a set of data transmissions over two or more component carriers from the set of component carriers. The DCI may include a CIF. In some other cases, the DCI may not include a CIF.

At 625, the UE 115-*b* may determine that the two or more component carriers include the first component carrier and the second component carrier based on the monitored search space, the CIF within the DCI, or both. For example, the monitored search space may be associated with the two or more component carriers. Here, the UE 115-*b* may determine that the two or more component carriers include the first component carrier and the second component carrier based on the monitored search space being associated with the first component carrier and the second component carrier. Additionally, the DCI may include a CIF having a value indicating the first component carrier and the second component carrier. Here, the UE 115-*b* may determine that the two or more component carriers include the first component carrier and the second component carrier based on the DCI including a CIF having a value indicating the first component carrier and the second component carrier. In some other cases, the DCI may not include a CIF. Here, the UE 115-*b* may determine that the two or more component carriers include the first component carrier and the second component carrier based on the DCI failing to include a CIF.

At 630, the UE 115-*b* may optionally transmit data (e.g., by a PUSCH) to the base station 105-*b* over the first component carrier and the second component carrier based on the determining.

At 635, the UE 115-*b* may optionally receive data (e.g., by a PDSCH) from the base station 105-*b* over the first component carrier and the second component carrier.

Figure 7:
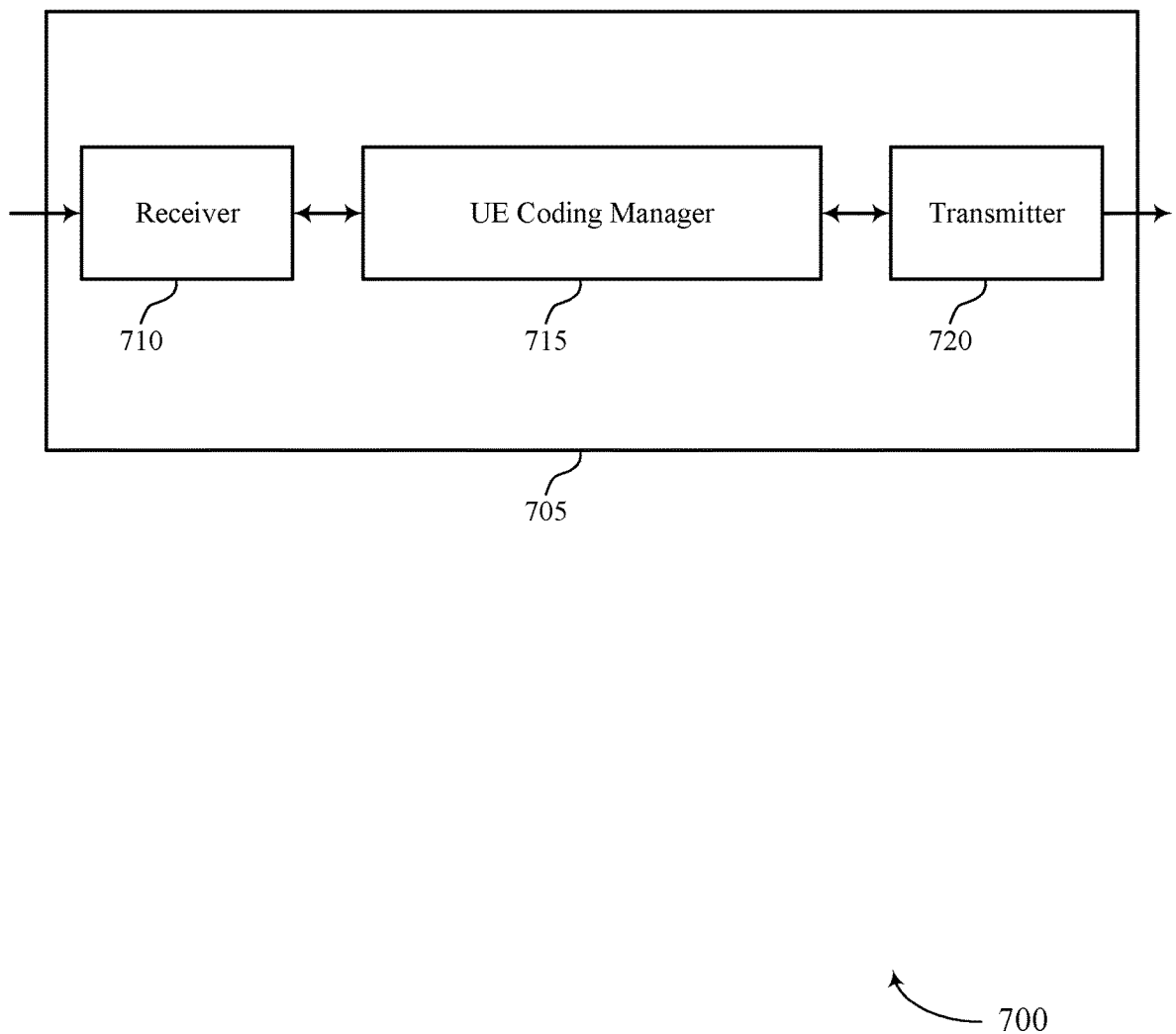
FIGS. 7 and 8 show block diagrams of devices that support configuring DCI to schedule multiple component carriers in accordance with aspects of the present disclosure.

FIG. 7 shows a block diagram 700 of a device 705 that supports configuring DCI to schedule multiple component carriers in accordance with aspects of the present disclosure. The device 705 may be an example of aspects of a UE 115 as described herein. The device 705 may include a receiver 710, a UE coding manager 715, and a transmitter 720. The device 705 may also include at least one processor. Each of these components may be in communication with one another (e.g., via one or more buses).

The receiver 710 may receive information such as packets, user data, or control information associated with various information channels (e.g., control channels, data channels, and information related to configuring DCI to schedule multiple component carriers). Information may be passed on to other components of the device 705. The receiver 710 may be an example of aspects of the transceiver 1020 described with reference to FIG. 10. The receiver 710 may utilize a single antenna or a set of antennas.

The UE coding manager 715 may connect to a base station over a set of component carriers according to a carrier aggregation configuration, the set of component carriers including at least a first component carrier and a second component carrier, monitor a search space configured for scheduling multiple component carriers, receive, from the base station, DCI based on the monitoring, the DCI scheduling a set of data transmissions over two or more component carriers from the set of component carriers, determine that the two or more component carriers include the first component carrier and the second component carrier based on the monitored search space, the CIF within the DCI, or both, and transmit or receive the set of data transmissions over the first component carrier and the second component carrier based on the determining. The UE coding manager 715 may be an example of aspects of the UE coding manager 1010 described herein.

The UE coding manager 715, or its sub-components, may be implemented in hardware, software (e.g., executed by at least one processor), or any combination thereof. If implemented in code executed by at least one processor, the functions of the UE coding manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE coding manager 715, or its sub-components, may be physically located at various positions, including being distributed such that portions of functions are implemented at different physical locations by one or more physical components. In some examples, the UE coding manager 715, or its sub-components, may be a separate and distinct component in accordance with various aspects of the present disclosure. In some examples, the UE coding manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

The actions performed by the UE coding manager 715 as described herein may be implemented to realize one or more potential advantages (e.g., at a modem of the UE 115). One implementation may allow a UE 115 to reduce control signaling overhead by decreasing a quantity of DCI transmissions necessary to schedule data transmissions over multiple component carriers. Another implementation may provide improved efficiency and throughput, as a number of separate resources allocated to control signaling (e.g., DCI) for the UE 115 may be reduced.

Figure 8:
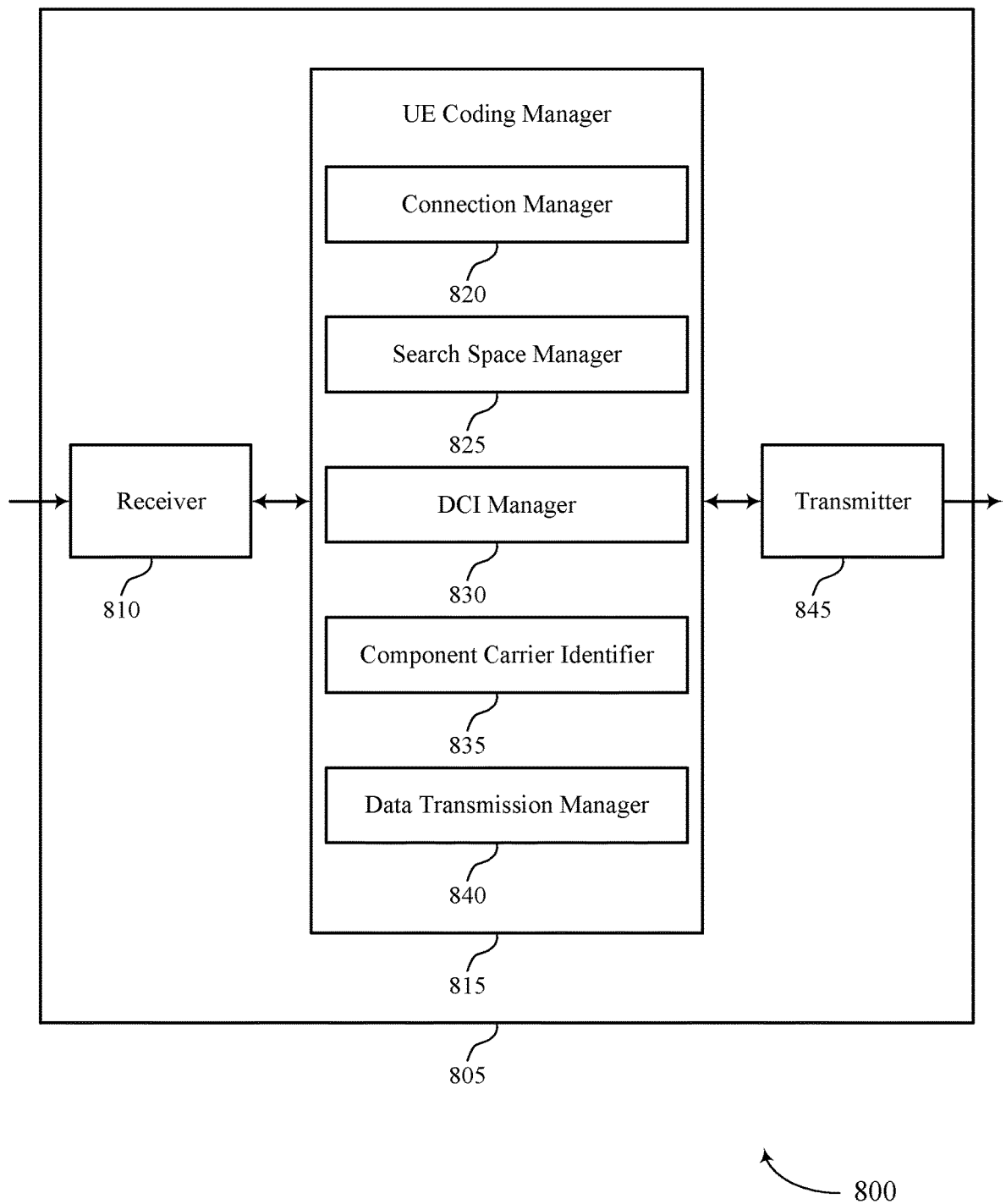

FIG. 8 shows a block diagram 800 of a device 805 that supports configuring DCI to schedule multiple component carriers in accordance with aspects of the present disclosure. The device 805 may be an example of aspects of a device 705, or a UE 115 as described herein. The device 805 may include a receiver 810, a UE coding manager 815, and a transmitter 845. The device 805 may also include at least one processor. Each of these components may be in communication with one another (e.g., via one or more buses).

The receiver 810 may receive information such as packets, user data, or control information associated with various information channels (e.g., control channels, data channels, and information related to configuring DCI to schedule multiple component carriers). Information may be passed on to other components of the device 805. The receiver 810 may be an example of aspects of the transceiver 1020 described with reference to FIG. 10. The receiver 810 may utilize a single antenna or a set of antennas.

The UE coding manager 815 may be an example of aspects of the UE coding manager 715 as described herein. The UE coding manager 815 may include a connection manager 820, a search space manager 825, a DCI manager 830, a component carrier identifier 835, and a data transmission manager 840. The UE coding manager 815 may be an example of aspects of the UE coding manager 1010 described herein.

The connection manager 820 may connect to a base station over a set of component carriers according to a carrier aggregation configuration, the set of component carriers including at least a first component carrier and a second component carrier.

The search space manager 825 may monitor a search space configured for scheduling multiple component carriers.

The DCI manager 830 may receive, from the base station, DCI including a CIF based on the monitoring, the DCI scheduling a set of data transmissions over two or more component carriers from the set of component carriers.

The component carrier identifier 835 may determine that the two or more component carriers include the first component carrier and the second component carrier based on the monitored search space, the CIF within the DCI, or both.

The data transmission manager 840 may transmit or receive the set of data transmissions over the first component carrier and the second component carrier based on the determining.

The transmitter 845 may transmit signals generated by other components of the device 805. In some examples, the transmitter 845 may be collocated with a receiver 810 in a transceiver module. For example, the transmitter 845 may be an example of aspects of the transceiver 1020 described with reference to FIG. 10. The transmitter 845 may utilize a single antenna or a set of antennas.

Figure 9:
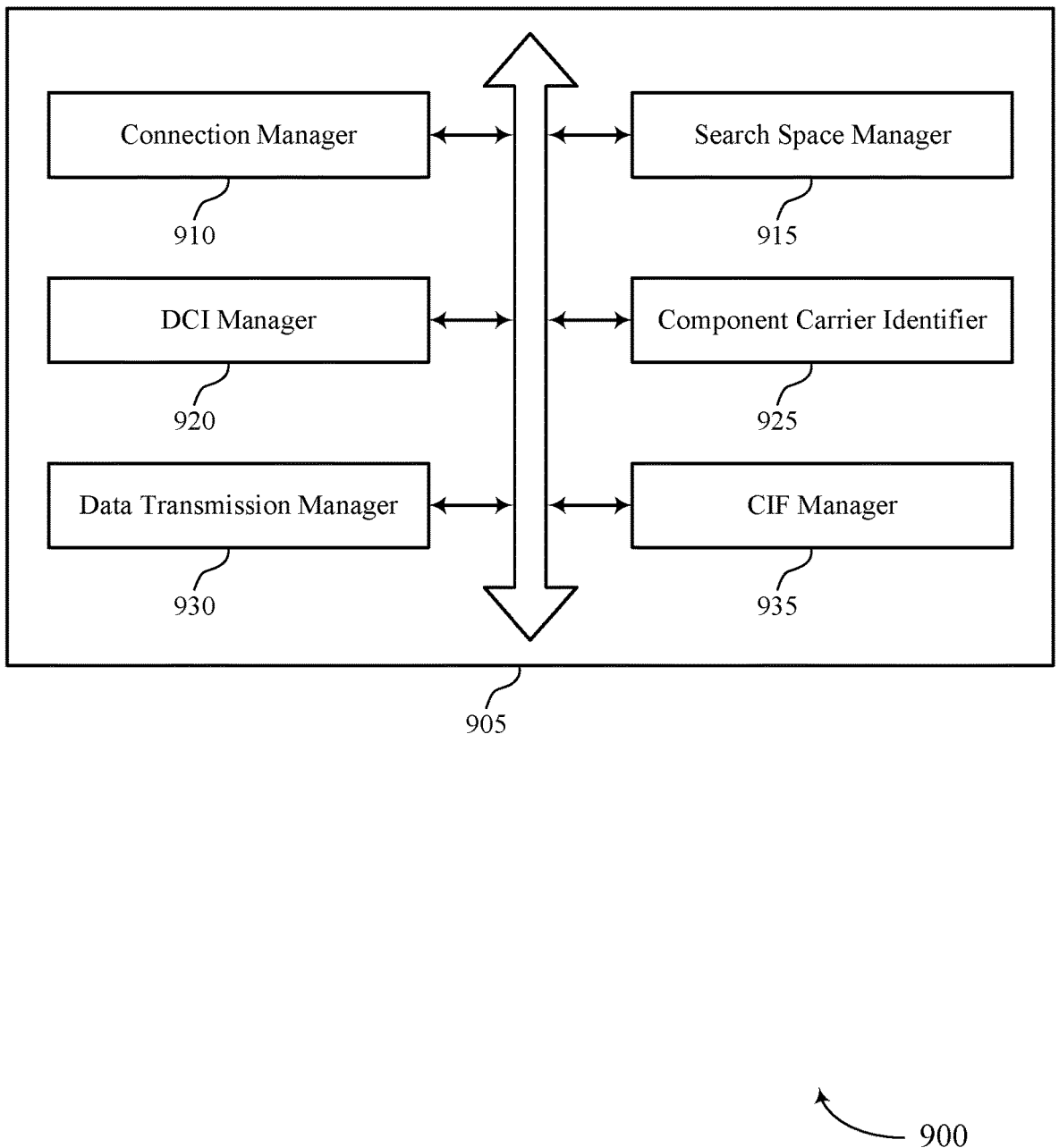
FIG. 9 shows a block diagram of a UE coding manager that supports configuring DCI to schedule multiple component carriers in accordance with aspects of the present disclosure.

FIG. 9 shows a block diagram 900 of a UE coding manager 905 that supports configuring DCI to schedule multiple component carriers in accordance with aspects of the present disclosure. The UE coding manager 905 may be an example of aspects of a UE coding manager 715, a UE coding manager 815, or a UE coding manager 1010 described herein. The UE coding manager 905 may include a connection manager 910, a search space manager 915, a DCI manager 920, a component carrier identifier 925, a data transmission manager 930, and a CIF manager 935. Each of these modules may communicate, directly or indirectly, with one another (e.g., via one or more buses).

The connection manager 910 may connect to a base station over a set of component carriers according to a carrier aggregation configuration, the set of component carriers including at least a first component carrier and a second component carrier.

The search space manager 915 may monitor a search space configured for scheduling multiple component carriers. In some examples, the search space manager 915 may receive, prior to monitoring the search space, configuration information for the search space indicating that the search space is for scheduling the first component carrier and the second component carrier. In some other examples, the search space manager 915 may receive, prior to monitoring the search space, configuration information for the search space indicating that the search space is configured for scheduling a single component carrier and the multiple component carriers, where monitoring the search space is based on receiving the configuration information. In some instances, the search space manager 915 may receive, from the base station, RRC signaling indicating a configuration for the search space, where monitoring the search space is based on receiving the RRC signaling.

In some examples, the search space manager 915 may monitor one or more additional search spaces separate from the search space configured for scheduling multiple component carriers. In some cases, the one or more additional search spaces may be configured for scheduling single component carriers. Additionally, the one or more additional search spaces may be configured for a third component carrier and a fourth component carrier different of the set of component carriers.

The DCI manager 920 may receive, from the base station, DCI including a CIF based on the monitoring, the DCI scheduling a set of data transmissions over two or more component carriers from the set of component carriers. In some cases, the DCI is a first DCI and includes the CIF having a first value indicating the multiple component carriers. In some other cases, the DCI is a first DCI and includes the CIF having a value indicating the single component carrier and the multiple component carriers. In some examples, the DCI manager 920 may receive, a second DCI scheduling a second set of data transmissions over the single component carrier based on monitoring the search space. In some cases, the second DCI may include a second CIF having a second value indicating the single component carrier. In some other cases, the second DCI may include a second CIF having the value indicating the single component carrier and the multiple component carriers.

In some examples, the DCI manager 920 may receive, from the base station, second DCI scheduling data transmissions over the single component carriers based on monitoring the one or more additional search spaces. In some cases, the DCI manager 920 may receive, from the base station, second DCI scheduling data transmissions over the third component carrier and the fourth component carrier based on monitoring the additional search space. In some examples, the DCI manager 920 may receive the DCI over a third component carrier from the set of component carriers, where the third component carrier is different from the first component carrier and the second component carrier.

The component carrier identifier 925 may determine that the two or more component carriers include the first component carrier and the second component carrier based on the monitored search space, the CIF within the DCI, or both. In some cases, determining that the two or more component carriers include the first component carrier and the second component carrier is based on the configuration information. Additionally, the component carrier identifier 925 may determine that the two or more component carriers include the first component carrier and the second component carrier based on the CIF having the first value indicating the multiple component carriers. In some examples, the component carrier identifier 925 may determine that the two or more component carriers include the first component carrier and the second component carrier based on the CIF having the value indicating the single component carrier and the multiple component carriers.

The data transmission manager 930 may transmit or receive the set of data transmissions over the first component carrier and the second component carrier based on the determining.

The CIF manager 935 may identify a first value for the CIF indicating the first component carrier based on receiving the configuration information for the search space. In some examples, the CIF manager 935 may identify a second value for the CIF indicating the second component carrier based on receiving the configuration information for the search space, where determining that the two or more component carriers include the first component carrier and the second component carrier is based on the CIF having the first value or the second value. In some cases, the CIF manager 935 may identify a value for the CIF indicating the first component carrier and the second component carrier based on receiving the configuration information for the search space, where determining that the two or more component carriers include the first component carrier and the second component carrier is based on the CIF having the value.

In some examples, the CIF manager 935 may identify the first value for the CIF indicating the multiple component carriers based on receiving the configuration information for the search space. In some cases, the CIF manager 935 may identify a second value for the CIF indicating the single component carrier based on receiving the configuration information for the search space. In some instances, the CIF manager 935 may identify the value for the CIF indicating the single component carrier and the multiple component carriers based on receiving the configuration information for the search space.

Figure 10:
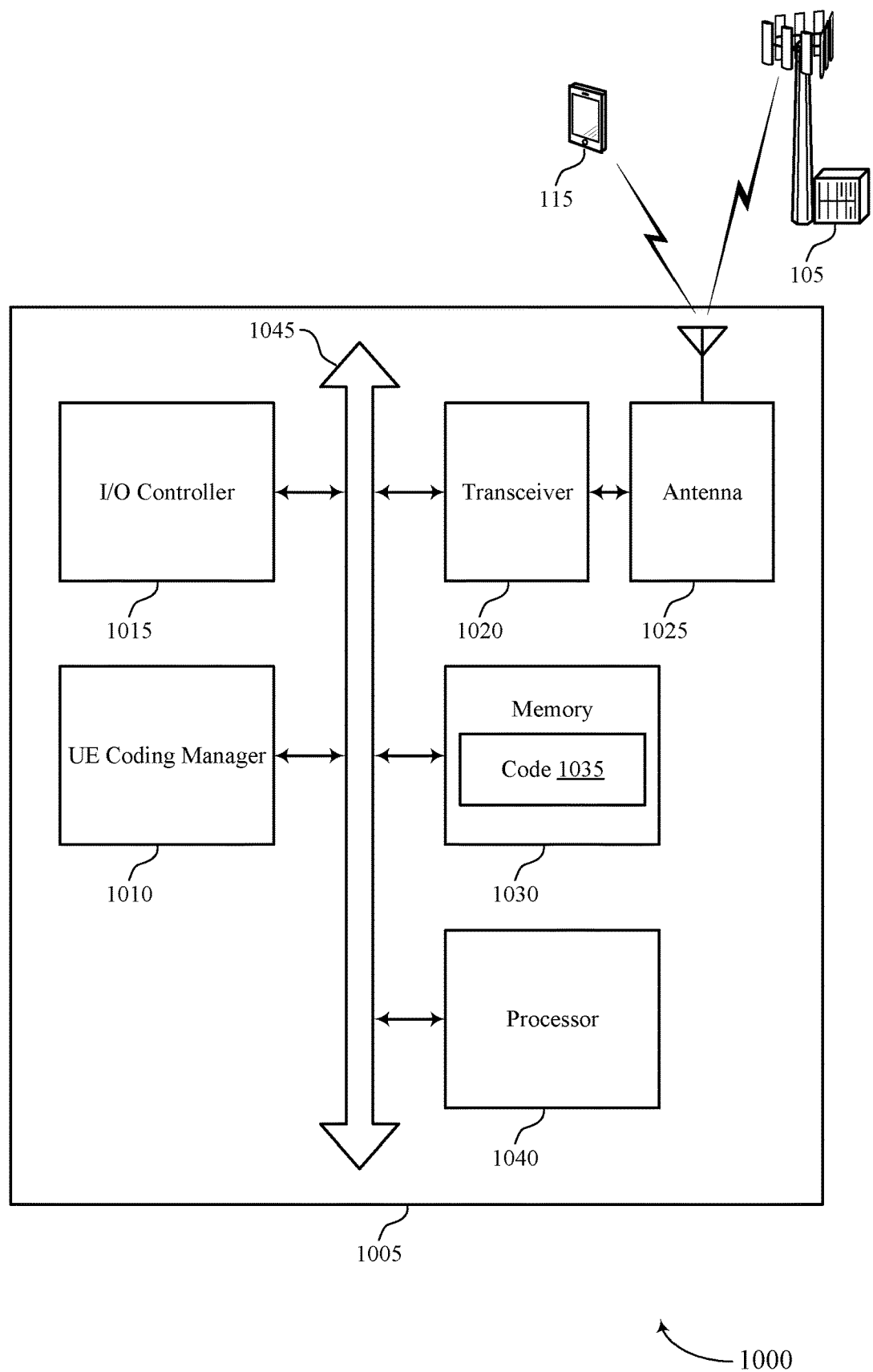
FIG. 10 shows a diagram of a system including a device that supports configuring DCI to schedule multiple component carriers in accordance with aspects of the present disclosure.

FIG. 10 shows a diagram of a system 1000 including a device 1005 that supports configuring DCI to schedule multiple component carriers in accordance with aspects of the present disclosure. The device 1005 may be an example of or include the components of device 705, device 805, or a UE 115 as described herein. The device 1005 may include components for bi-directional voice and data communications including components for transmitting and receiving communications, including a UE coding manager 1010, an I/O controller 1015, a transceiver 1020, an antenna 1025, memory 1030, and a processor 1040. These components may be in electronic communication via one or more buses (e.g., bus 1045).

The UE coding manager 1010 may connect to a base station over a set of component carriers according to a carrier aggregation configuration, the set of component carriers including at least a first component carrier and a second component carrier, monitor a search space configured for scheduling multiple component carriers, receive, from the base station, DCI including a CIF based on the monitoring, the DCI scheduling a set of data transmissions over two or more component carriers from the set of component carriers, determine that the two or more component carriers include the first component carrier and the second component carrier based on the monitored search space, the CIF within the DCI, or both, and transmit or receive the set of data transmissions over the first component carrier and the second component carrier based on the determining.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting configuring DCI to schedule multiple component carriers).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

The actions performed by the UE coding manager 1010 as described herein may be implemented to realize one or more potential advantages (e.g., at a handset of the UE 115). One implementation may allow a UE 115 to save power and increase battery life by avoiding having to receive multiple DCI transmissions to schedule data transmissions over multiple component carriers. Additionally, a throughput and efficiency associated with the UE 115 may be increased due to a decrease of signaling overhead (e.g., a decrease in DCI signaling).

Figure 11:
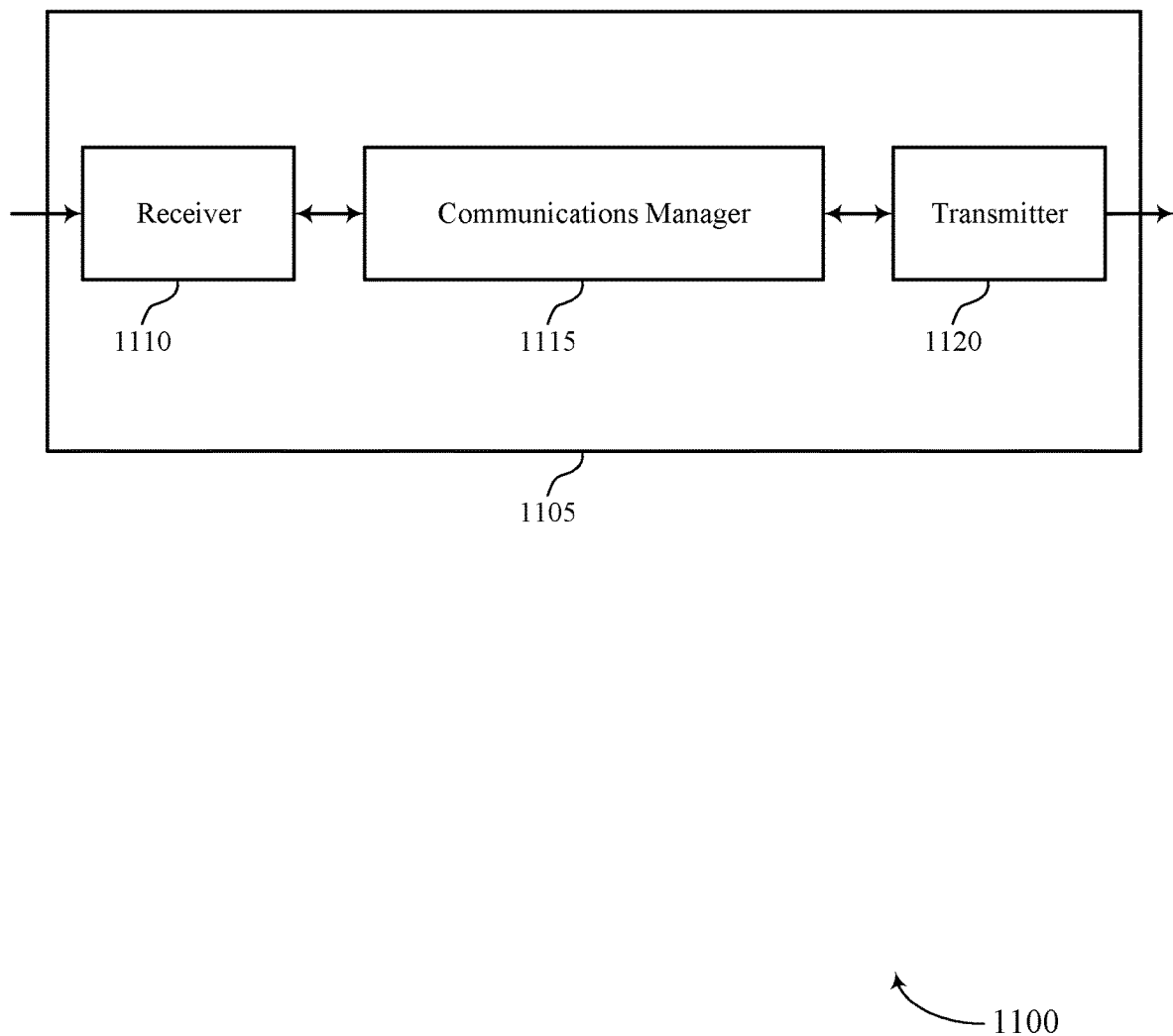
FIGS. 11 and 12 show block diagrams of devices that support configuring DCI to schedule multiple component carriers in accordance with aspects of the present disclosure.

FIG. 11 shows a block diagram 1100 of a device 1105 that supports configuring DCI to schedule multiple component carriers in accordance with aspects of the present disclosure. The device 1105 may be an example of aspects of a base station 105 as described herein. The device 1105 may include a receiver 1110, a communications manager 1115, and a transmitter 1120. The device 1105 may also include at least one processor. Each of these components may be in communication with one another (e.g., via one or more buses).

The receiver 1110 may receive information such as packets, user data, or control information associated with various information channels (e.g., control channels, data channels, and information related to configuring DCI to schedule multiple component carriers). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may connect with a UE over a set of component carriers according to a carrier aggregation configuration, the set of component carriers including at least a first component carrier and a second component carrier, transmit, to the UE, configuration information for a search space configured for scheduling multiple component carriers, transmit DCI including a CIF based on transmitting the configuration information, the DCI scheduling a set of data transmissions over the first component carrier and the second component carrier, where the first component carrier and the second component carrier are indicated from the set of component carriers by the monitored search space, the CIF within the DCI, or both, and transmit or receive the set of data transmissions over the first component carrier and the second component carrier based on transmitting the DCI. The communications manager 1115 may be an example of aspects of the communications manager 1410 described herein.

The communications manager 1115, or its sub-components, may be implemented in hardware, software (e.g., executed by at least one processor), or any combination thereof. If implemented in code executed by at least one processor, the functions of the communications manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
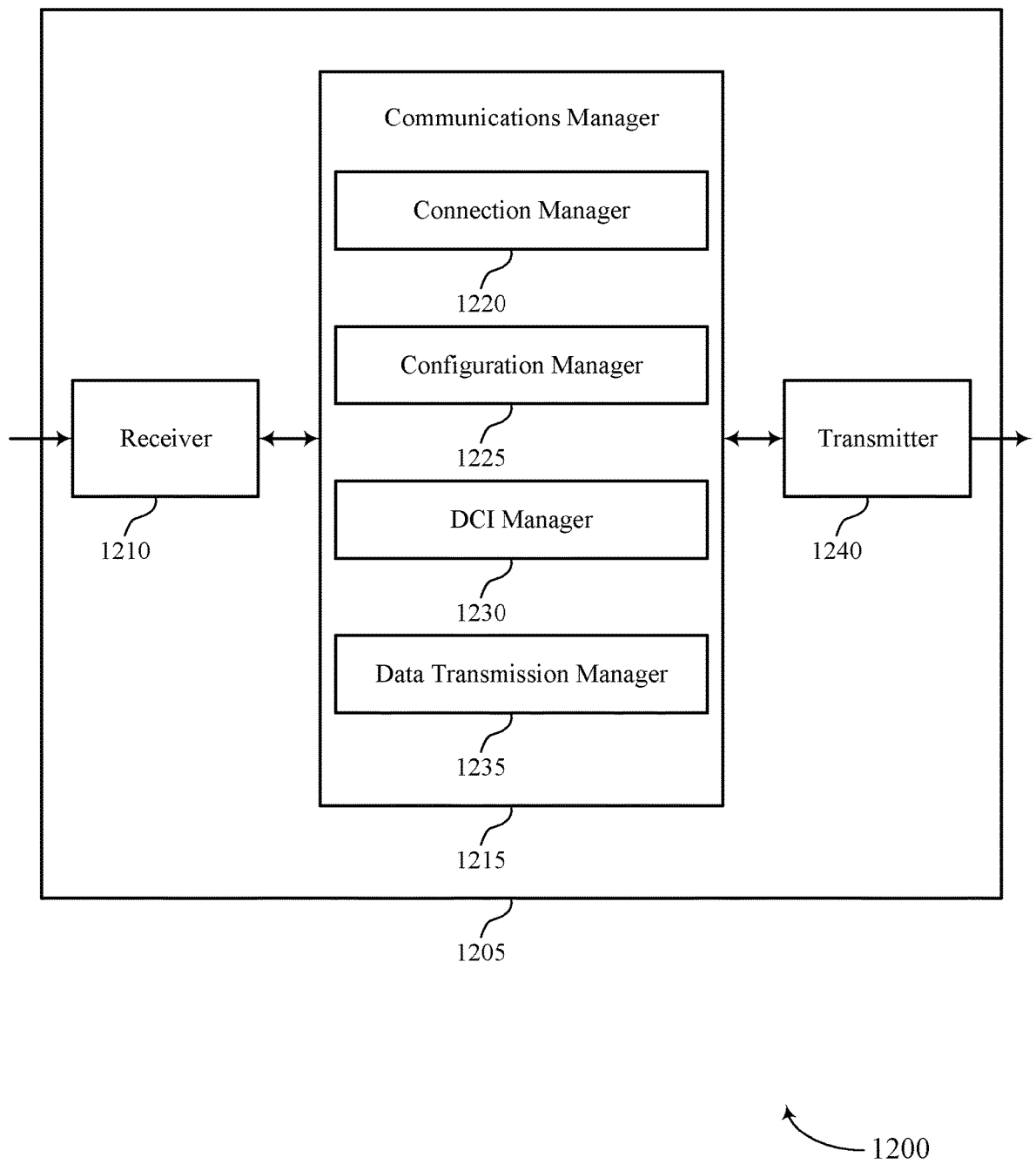

FIG. 12 shows a block diagram 1200 of a device 1205 that supports configuring DCI to schedule multiple component carriers in accordance with aspects of the present disclosure. The device 1205 may be an example of aspects of a device 1105, or a base station 105 as described herein. The device 1205 may include a receiver 1210, a communications manager 1215, and a transmitter 1240. The device 1205 may also include at least one processor. Each of these components may be in communication with one another (e.g., via one or more buses).

The receiver 1210 may receive information such as packets, user data, or control information associated with various information channels (e.g., control channels, data channels, and information related to configuring DCI to schedule multiple component carriers). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a connection manager 1220, a configuration manager 1225, a DCI manager 1230, and a data transmission manager 1235. The communications manager 1215 may be an example of aspects of the communications manager 1410 described herein.

The connection manager 1220 may connect with a UE over a set of component carriers according to a carrier aggregation configuration, the set of component carriers including at least a first component carrier and a second component carrier.

The configuration manager 1225 may transmit, to the UE, configuration information for a search space configured for scheduling multiple component carriers.

The DCI manager 1230 may transmit DCI including a CIF based on transmitting the configuration information, the DCI scheduling a set of data transmissions over the first component carrier and the second component carrier, where the first component carrier and the second component carrier are indicated from the set of component carriers by the monitored search space, the CIF within the DCI, or both.

The data transmission manager 1235 may transmit or receive the set of data transmissions over the first component carrier and the second component carrier based on transmitting the DCI.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

Figure 13:
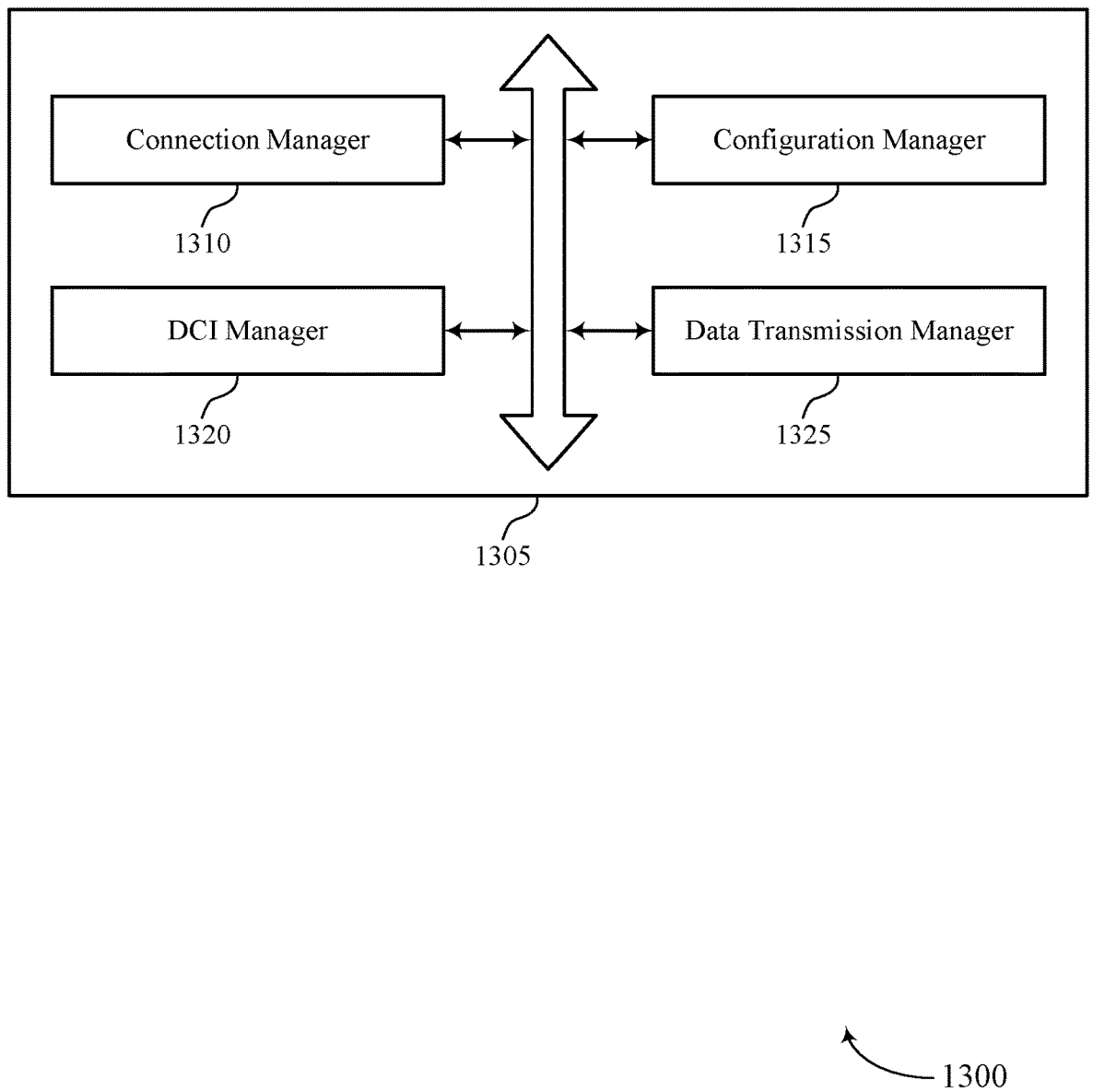
FIG. 13 shows a block diagram of a communications manager that supports configuring DCI to schedule multiple component carriers in accordance with aspects of the present disclosure.

FIG. 13 shows a block diagram 1300 of a communications manager 1305 that supports configuring DCI to schedule multiple component carriers in accordance with aspects of the present disclosure. The communications manager 1305 may be an example of aspects of a communications manager 1115, a communications manager 1215, or a communications manager 1410 described herein. The communications manager 1305 may include a connection manager 1310, a configuration manager 1315, a DCI manager 1320, and a data transmission manager 1325. Each of these modules may communicate, directly or indirectly, with one another (e.g., via one or more buses).

The connection manager 1310 may connect with a UE over a set of component carriers according to a carrier aggregation configuration, the set of component carriers including at least a first component carrier and a second component carrier.

The configuration manager 1315 may transmit, to the UE, configuration information for a search space configured for scheduling multiple component carriers. In some cases, the configuration manager 1315 may transmit, to the UE, RRC signaling indicating the configuration information. In some examples, the configuration manager 1315 may transmit configuration information for an additional search space separate from the search space configured for scheduling multiple component carriers, the additional search space configured for a third component carrier and a fourth component carrier different of the set of component carriers.

In some examples, the configuration manager 1315 may transmit configuration information for the search space indicating that the search space is for scheduling the first component carrier and the second component carrier. In some examples, the configuration manager 1315 may indicate the first component carrier and the second component carrier from the set of component carriers based on the CIF within the DCI having the first value or the second value. In some examples, the configuration manager 1315 may indicate the first component carrier and the second component carrier from the set of component carriers is based on the CIF within the DCI having the value.

In some examples, the configuration manager 1315 may transmit configuration information for the search space indicating that the search space is configured for scheduling a single component carrier and the multiple component carriers. In some other examples, the configuration manager 1315 may indicate the first component carrier and the second component carrier from the set of component carriers based on the CIF having the value indicating the single component carrier and the multiple component carriers. In some instances, the configuration manager 1315 may transmit configuration information for one or more additional search spaces separate from the search space configured for scheduling multiple component carriers, the one or more additional search spaces configured for scheduling single component carriers.

In some cases, the configuration information indicates a first value for the CIF associated with the first component carrier and a second value for the CIF associated with the second component carrier. In some instances, the configuration information indicates a value for the CIF associated with the first component carrier and the second component carrier. In some examples, the configuration information indicates the first value for the CIF associated with the multiple component carriers. In some cases, the configuration information indicates a second value for the CIF associated with the single component carrier. In some instances, the configuration information indicates the value for the CIF associated with the single component carrier and the multiple component carriers.

The DCI manager 1320 may transmit DCI including a CIF based on transmitting the configuration information, the DCI scheduling a set of data transmissions over the first component carrier and the second component carrier, where the first component carrier and the second component carrier are indicated from the set of component carriers by the monitored search space, the CIF within the DCI, or both. In some examples, the DCI manager 1320 may indicate the first component carrier and the second component carrier from the set of component carriers based on the CIF having the first value indicating the multiple component carriers. In some examples, the DCI manager 1320 may transmit the DCI over a third component carrier from the set of component carriers, the third component carrier different from the first component carrier and the second component carrier. In some cases, the DCI is a first DCI and includes the CIF having a first value indicating the multiple component carriers. In some other cases, the DCI is a first DCI and includes the CIF having a value indicating the single component carrier and the multiple component carriers.

In some cases, the DCI manager 1320 may transmit, a second DCI scheduling a second set of data transmissions over the single component carrier based on transmitting the configuration information. In some instances, the second DCI may include a second CIF having a second value indicating the single component carrier. In some other instances, the second DCI may include a second CIF having the value indicating the single component carrier and the multiple component carriers. In some examples, the DCI manager 1320 may transmit, to the UE, second DCI scheduling data transmissions over the third component carrier and the fourth component carrier based on transmitting the configuration information for the additional search space.

The data transmission manager 1325 may transmit or receive the set of data transmissions over the first component carrier and the second component carrier based on transmitting the DCI.

Figure 14:
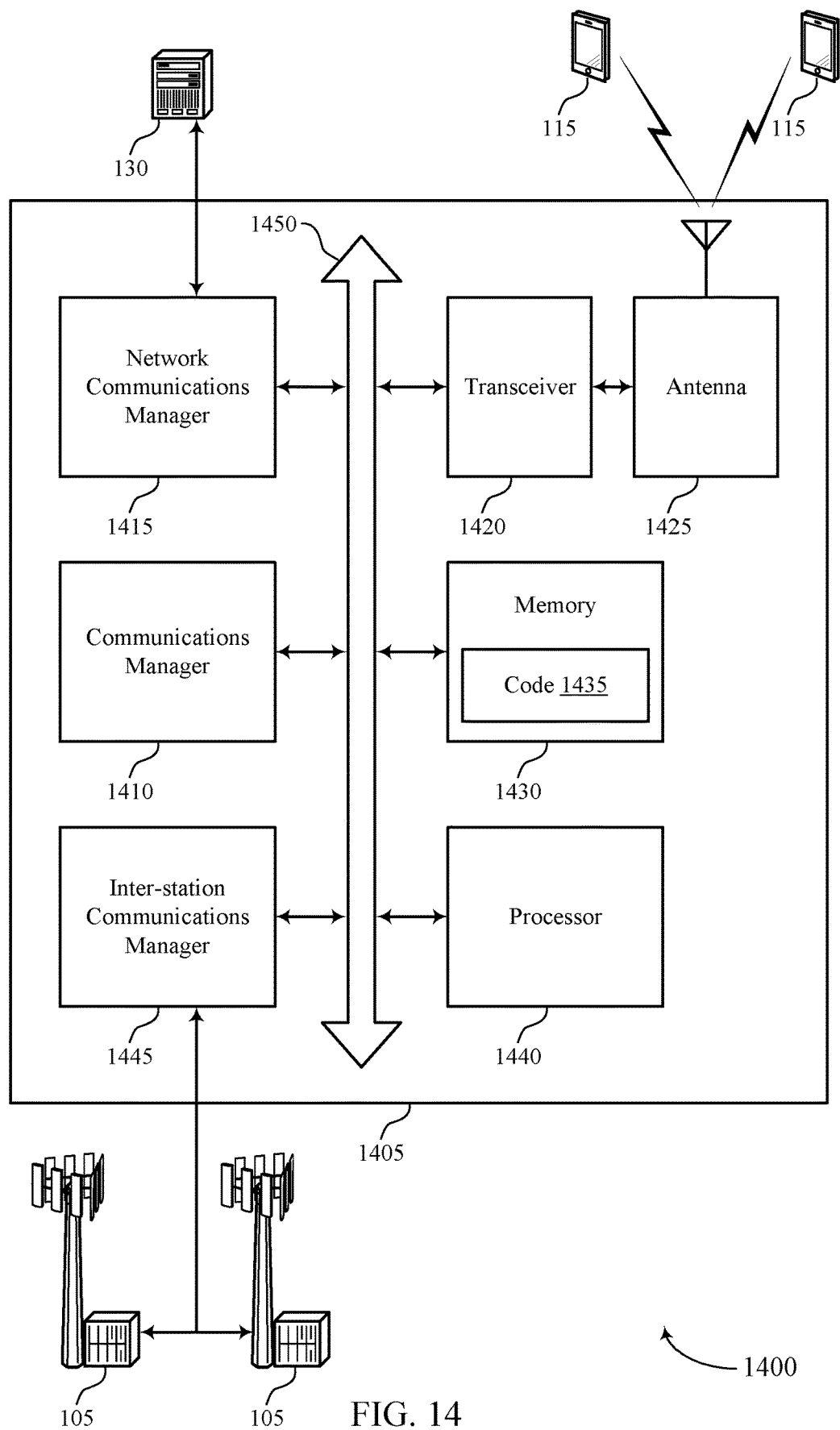
FIG. 14 shows a diagram of a system including a device that supports configuring DCI to schedule multiple component carriers in accordance with aspects of the present disclosure.

FIG. 14 shows a diagram of a system 1400 including a device 1405 that supports configuring DCI to schedule multiple component carriers in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may connect with a UE over a set of component carriers according to a carrier aggregation configuration, the set of component carriers including at least a first component carrier and a second component carrier, transmit, to the UE, configuration information for a search space configured for scheduling multiple component carriers, transmit DCI including a CIF based on transmitting the configuration information, the DCI scheduling a set of data transmissions over the first component carrier and the second component carrier, where the first component carrier and the second component carrier are indicated from the set of component carriers by the monitored search space, the CIF within the DCI, or both, and transmit or receive the set of data transmissions over the first component carrier and the second component carrier based on transmitting the DCI.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by at least one processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting configuring DCI to schedule multiple component carriers).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

In some cases, the actions performed by the network communications manager 1415 may be implemented to realize one or more potential advantages. One implementation may allow the base station 105 to save power and increase batter life by avoiding having to transmit multiple DCI transmissions to schedule data transmissions over multiple component carriers. Another implementation may provide improved throughput and efficiency due to a decreased signaling overhead associated with scheduling data transmissions over multiple component carriers.

Figure 15:
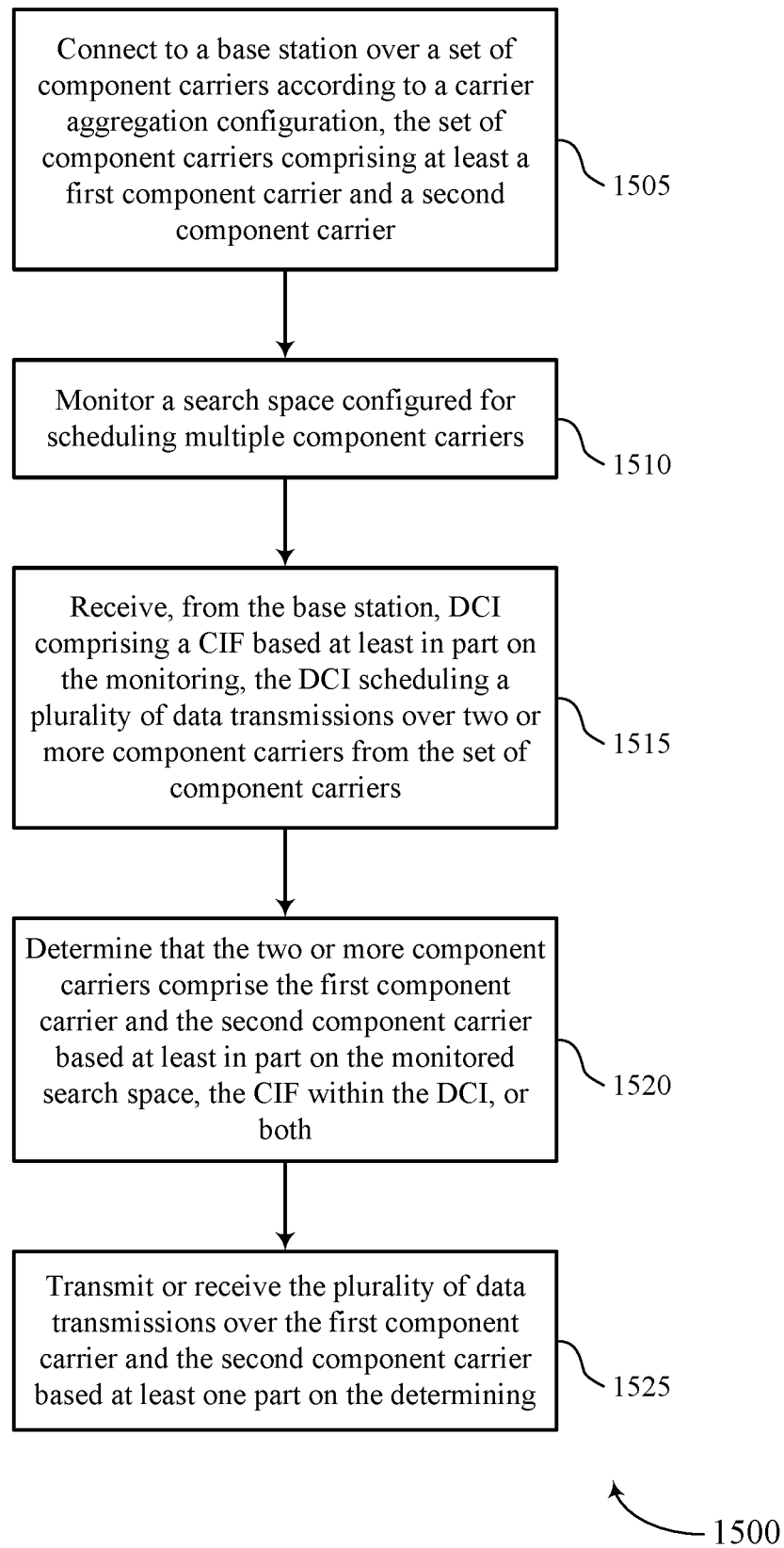
FIGS. 15 through 20 show flowcharts illustrating methods that support configuring DCI to schedule multiple component carriers in accordance with aspects of the present disclosure.

FIG. 15 shows a flowchart illustrating a method 1500 that supports configuring DCI to schedule multiple component carriers in accordance with aspects of the present disclosure. The operations of method 1500 may be implemented by a UE 115 or its components as described herein. For example, the operations of method 1500 may be performed by a UE coding manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may connect to a base station over a set of component carriers according to a carrier aggregation configuration, the set of component carriers comprising at least a first component carrier and a second component carrier. The operations of 1505 may be performed according to the methods described herein. In some examples, aspects of the operations of 1505 may be performed by a connection manager as described with reference to FIGS. 7 through 10.

At 1510, the UE may monitor a search space configured for scheduling multiple component carriers. The operations of 1510 may be performed according to the methods described herein. In some examples, aspects of the operations of 1510 may be performed by a search space manager as described with reference to FIGS. 7 through 10.

At 1515, the UE may receive, from the base station, DCI comprising a CIF based at least in part on the monitoring, the DCI scheduling a plurality of data transmissions over two or more component carriers from the set of component carriers. The operations of 1515 may be performed according to the methods described herein. In some examples, aspects of the operations of 1515 may be performed by a DCI manager as described with reference to FIGS. 7 through 10.

At 1520, the UE may determine that the two or more component carriers comprise the first component carrier and the second component carrier based at least in part on the monitored search space, the CIF within the DCI, or both. The operations of 1520 may be performed according to the methods described herein. In some examples, aspects of the operations of 1520 may be performed by a component carrier identifier as described with reference to FIGS. 7 through 10.

At 1525, the UE may transmit or receive the plurality of data transmissions over the first component carrier and the second component carrier based at least in part on the determining. The operations of 1525 may be performed according to the methods described herein. In some examples, aspects of the operations of 1525 may be performed by a data transmission manager as described with reference to FIGS. 7 through 10.

Figure 16:
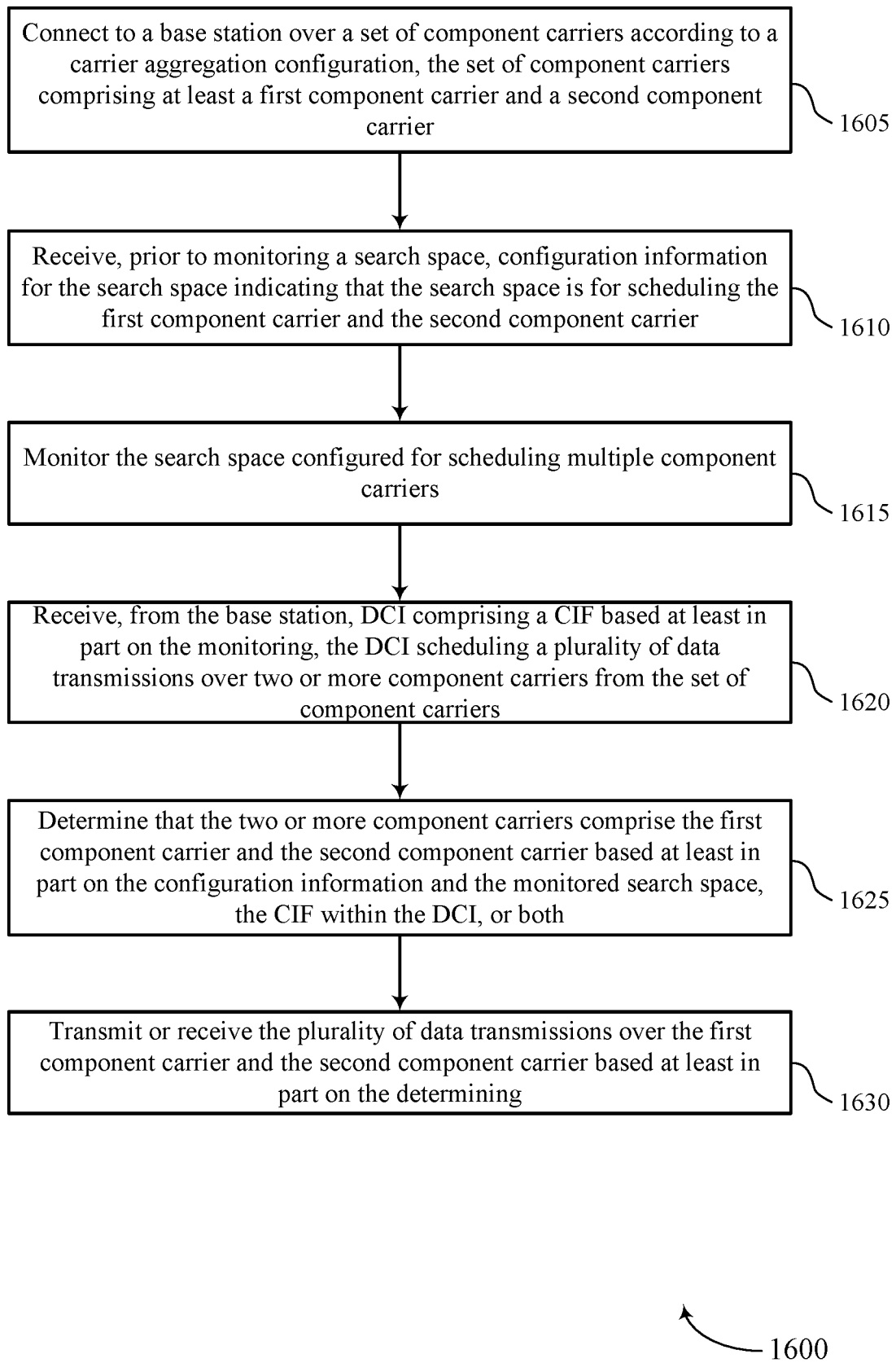

FIG. 16 shows a flowchart illustrating a method 1600 that supports configuring DCI to schedule multiple component carriers in accordance with aspects of the present disclosure. The operations of method 1600 may be implemented by a UE 115 or its components as described herein. For example, the operations of method 1600 may be performed by a UE coding manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may connect to a base station over a set of component carriers according to a carrier aggregation configuration, the set of component carriers comprising at least a first component carrier and a second component carrier. The operations of 1605 may be performed according to the methods described herein. In some examples, aspects of the operations of 1605 may be performed by a connection manager as described with reference to FIGS. 7 through 10.

At 1610, the UE may receive, prior to monitoring a search space, configuration information for a search space indicating that the search space is for scheduling the first component carrier and the second component carrier. The operations of 1610 may be performed according to the methods described herein. In some examples, aspects of the operations of 1610 may be performed by a search space manager as described with reference to FIGS. 7 through 10.

At 1615, the UE may monitor the search space configured for scheduling multiple component carriers. The operations of 1615 may be performed according to the methods described herein. In some examples, aspects of the operations of 1615 may be performed by a search space manager as described with reference to FIGS. 7 through 10.

At 1620, the UE may receive, from the base station, DCI comprising a CIF based at least in part on the monitoring, the DCI scheduling a plurality of data transmissions over two or more component carriers from the set of component carriers. The operations of 1620 may be performed according to the methods described herein. In some examples, aspects of the operations of 1620 may be performed by a DCI manager as described with reference to FIGS. 7 through 10.

At 1625, the UE may determine that the two or more component carriers comprise the first component carrier and the second component carrier based at least in part on the configuration information and the monitored search space, the CIF within the DCI, or both. The operations of 1625 may be performed according to the methods described herein. In some examples, aspects of the operations of 1625 may be performed by a component carrier identifier as described with reference to FIGS. 7 through 10.

At 1630, the UE may transmit or receive the plurality of data transmissions over the first component carrier and the second component carrier based at least in part on the determining. The operations of 1630 may be performed according to the methods described herein. In some examples, aspects of the operations of 1630 may be performed by a data transmission manager as described with reference to FIGS. 7 through 10.

Figure 17:
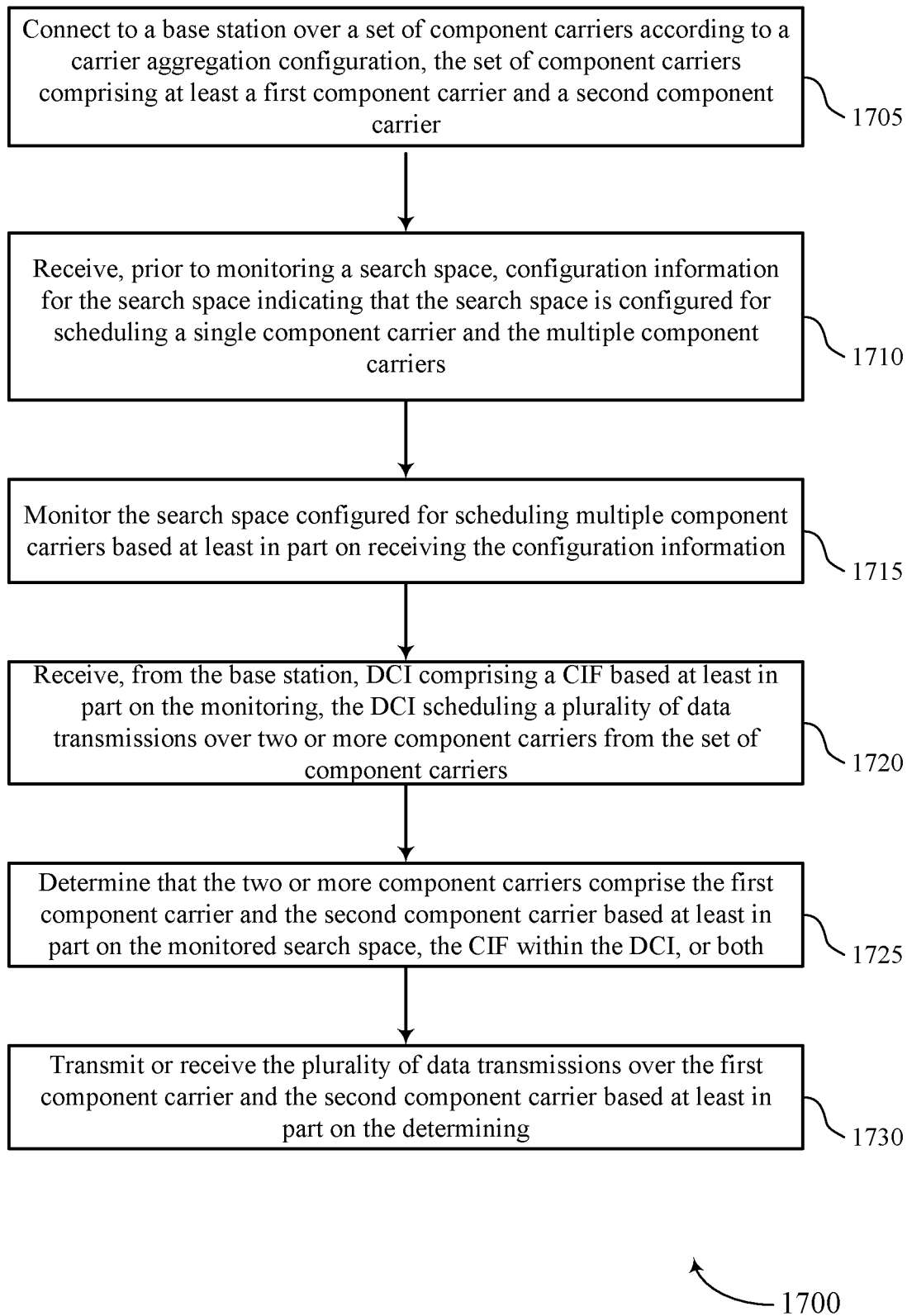

FIG. 17 shows a flowchart illustrating a method 1700 that supports configuring DCI to schedule multiple component carriers in accordance with aspects of the present disclosure. The operations of method 1700 may be implemented by a UE 115 or its components as described herein. For example, the operations of method 1700 may be performed by a UE coding manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may connect to a base station over a set of component carriers according to a carrier aggregation configuration, the set of component carriers comprising at least a first component carrier and a second component carrier. The operations of 1705 may be performed according to the methods described herein. In some examples, aspects of the operations of 1705 may be performed by a connection manager as described with reference to FIGS. 7 through 10.

At 1710, the UE may receive, prior to monitoring a search space, configuration information for the search space indicating that the search space is configured for scheduling a single component carrier and the multiple component carriers, wherein monitoring the search space is based at least in part on receiving the configuration information. The operations of 1710 may be performed according to the methods described herein. In some examples, aspects of the operations of 1710 may be performed by a search space manager as described with reference to FIGS. 7 through 10.

At 1715, the UE may monitor the search space configured for scheduling multiple component carriers. The operations of 1715 may be performed according to the methods described herein. In some examples, aspects of the operations of 1715 may be performed by a search space manager as described with reference to FIGS. 7 through 10.

At 1720, the UE may receive, from the base station, DCI comprising a CIF based at least in part on the monitoring, the DCI scheduling a plurality of data transmissions over two or more component carriers from the set of component carriers. The operations of 1720 may be performed according to the methods described herein. In some examples, aspects of the operations of 1720 may be performed by a DCI manager as described with reference to FIGS. 7 through 10.

At 1725, the UE may determine that the two or more component carriers comprise the first component carrier and the second component carrier based at least in part on the monitored search space, the CIF within the DCI, or both. The operations of 1725 may be performed according to the methods described herein. In some examples, aspects of the operations of 1725 may be performed by a component carrier identifier as described with reference to FIGS. 7 through 10.

At 1730, the UE may transmit or receive the plurality of data transmissions over the first component carrier and the second component carrier based at least in part on the determining. The operations of 1730 may be performed according to the methods described herein. In some examples, aspects of the operations of 1730 may be performed by a data transmission manager as described with reference to FIGS. 7 through 10.

Figure 18:
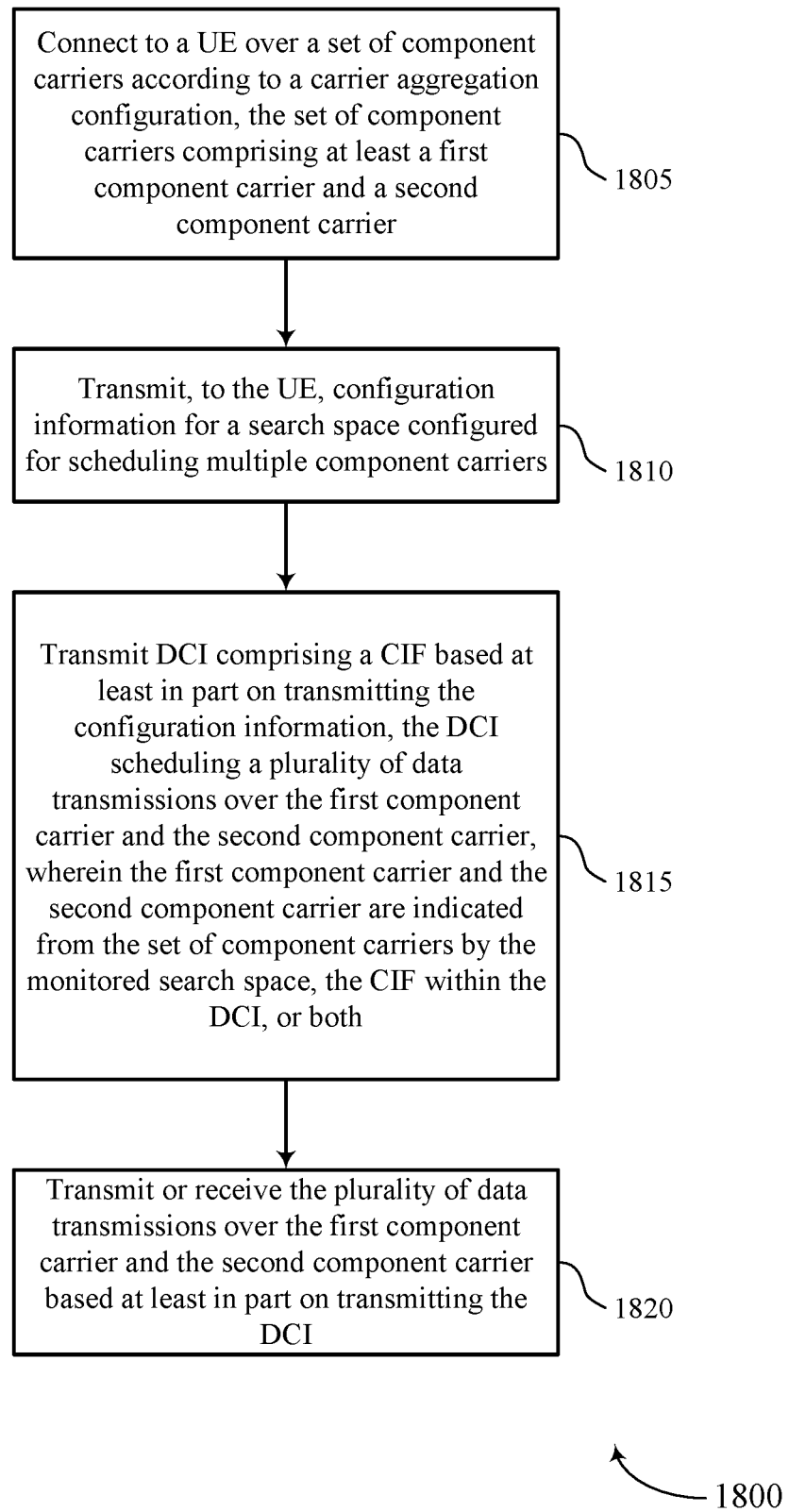

FIG. 18 shows a flowchart illustrating a method 1800 that supports configuring DCI to schedule multiple component carriers in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may connect with a UE over a set of component carriers according to a carrier aggregation configuration, the set of component carriers comprising at least a first component carrier and a second component carrier. The operations of 1805 may be performed according to the methods described herein. In some examples, aspects of the operations of 1805 may be performed by a connection manager as described with reference to FIGS. 11 through 14.

At 1810, the base station may transmit, to the UE, configuration information for a search space configured for scheduling multiple component carriers. The operations of 1810 may be performed according to the methods described herein. In some examples, aspects of the operations of 1810 may be performed by a configuration manager as described with reference to FIGS. 11 through 14.

At 1815, the base station may transmit DCI comprising a CIF based at least in part on transmitting the configuration information, the DCI scheduling a plurality of data transmissions over the first component carrier and the second component carrier, wherein the first component carrier and the second component carrier are indicated from the set of component carriers by the monitored search space, the CIF within the DCI, or both. The operations of 1815 may be performed according to the methods described herein. In some examples, aspects of the operations of 1815 may be performed by a DCI manager as described with reference to FIGS. 11 through 14.

At 1820, the base station may transmit or receive the plurality of data transmissions over the first component carrier and the second component carrier based at least in part on transmitting the DCI. The operations of 1820 may be performed according to the methods described herein. In some examples, aspects of the operations of 1820 may be performed by a data transmission manager as described with reference to FIGS. 11 through 14.

Figure 19:
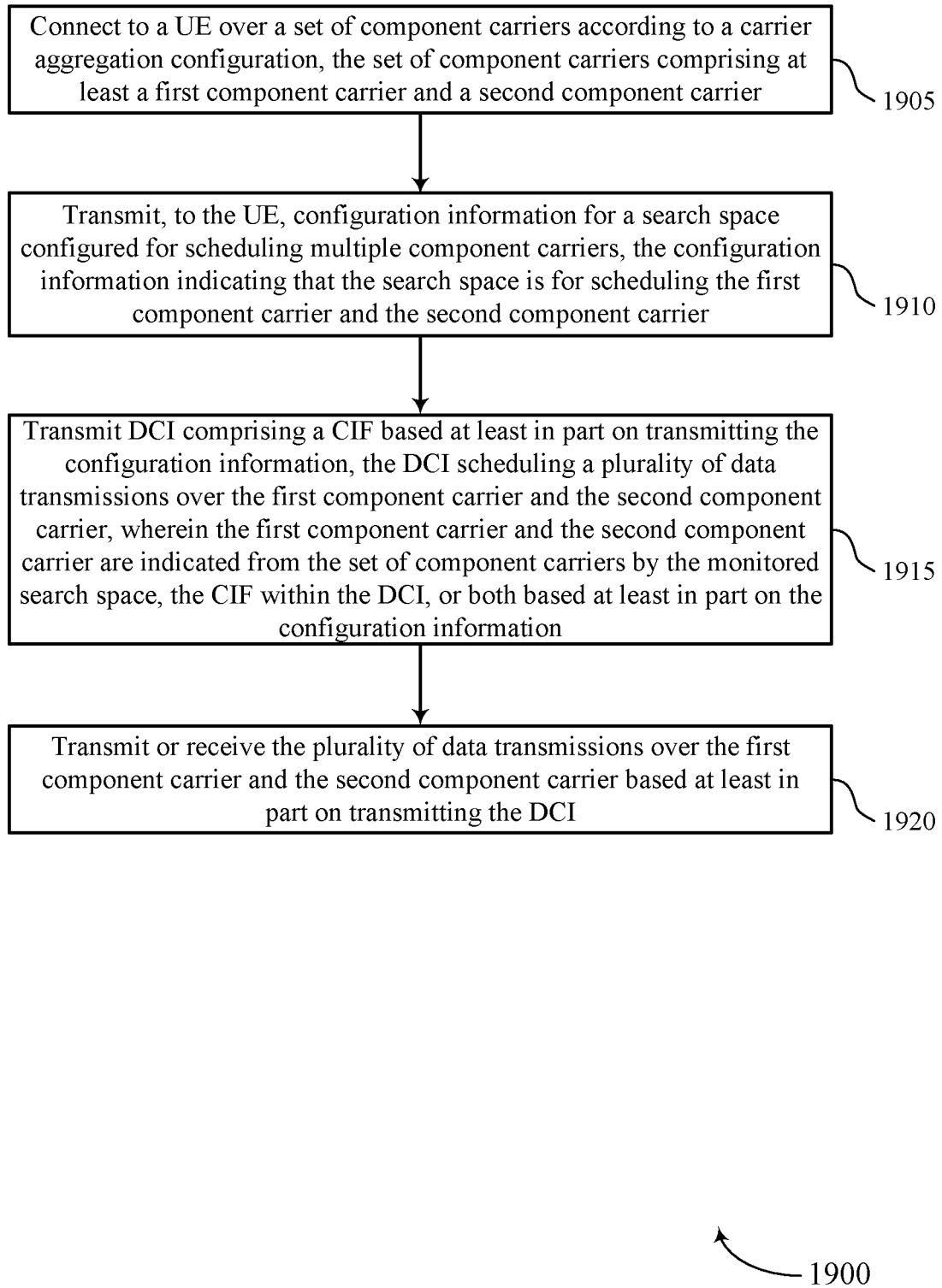

FIG. 19 shows a flowchart illustrating a method 1900 that supports configuring DCI to schedule multiple component carriers in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1905, the base station may connect with a UE over a set of component carriers according to a carrier aggregation configuration, the set of component carriers comprising at least a first component carrier and a second component carrier. The operations of 1905 may be performed according to the methods described herein. In some examples, aspects of the operations of 1905 may be performed by a connection manager as described with reference to FIGS. 11 through 14.

At 1910, the base station may transmit, to the UE, configuration information for a search space configured for scheduling multiple component carriers, the configuration information indicating that the search space is for scheduling the first component carrier and the second component carrier. The operations of 1910 may be performed according to the methods described herein. In some examples, aspects of the operations of 1910 may be performed by a configuration manager as described with reference to FIGS. 11 through 14.

At 1915, the base station may transmit DCI comprising a CIF based at least in part on transmitting the configuration information, the DCI scheduling a plurality of data transmissions over the first component carrier and the second component carrier, wherein the first component carrier and the second component carrier are indicated from the set of component carriers by the monitored search space, the CIF within the DCI, or both based at least in part on the configuration information. The operations of 1915 may be performed according to the methods described herein. In some examples, aspects of the operations of 1915 may be performed by a DCI manager as described with reference to FIGS. 11 through 14.

At 1920, the base station may transmit or receive the plurality of data transmissions over the first component carrier and the second component carrier based at least in part on transmitting the DCI. The operations of 1920 may be performed according to the methods described herein. In some examples, aspects of the operations of 1920 may be performed by a data transmission manager as described with reference to FIGS. 11 through 14.

Figure 20:
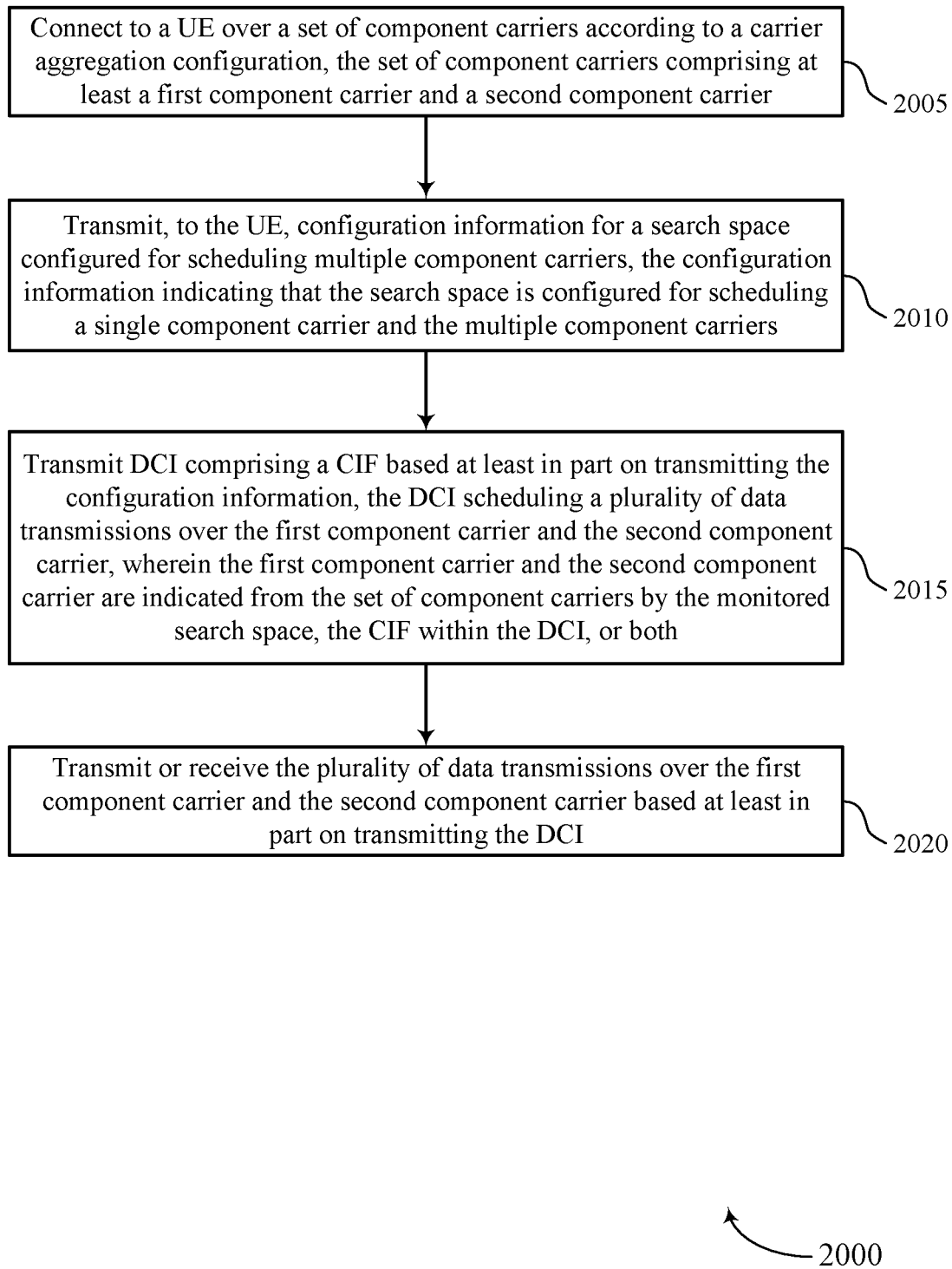

FIG. 20 shows a flowchart illustrating a method 2000 that supports configuring DCI to schedule multiple component carriers in accordance with aspects of the present disclosure. The operations of method 2000 may be implemented by a base station 105 or its components as described herein. For example, the operations of method 2000 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2005, the base station may connect with a UE over a set of component carriers according to a carrier aggregation configuration, the set of component carriers comprising at least a first component carrier and a second component carrier. The operations of 2005 may be performed according to the methods described herein. In some examples, aspects of the operations of 2005 may be performed by a connection manager as described with reference to FIGS. 11 through 14.

At 2010, the base station may transmit, to the UE, configuration information for a search space configured for scheduling multiple component carriers, the configuration information indicating that the search space is configured for scheduling a single component carrier and the multiple component carriers. The operations of 2010 may be performed according to the methods described herein. In some examples, aspects of the operations of 2010 may be performed by a configuration manager as described with reference to FIGS. 11 through 14.

At 2015, the base station may transmit DCI comprising a CIF based at least in part on transmitting the configuration information, the DCI scheduling a plurality of data transmissions over the first component carrier and the second component carrier, wherein the first component carrier and the second component carrier are indicated from the set of component carriers by the monitored search space, the CIF within the DCI, or both. The operations of 2015 may be performed according to the methods described herein. In some examples, aspects of the operations of 2015 may be performed by a DCI manager as described with reference to FIGS. 11 through 14.

At 2020, the base station may transmit or receive the plurality of data transmissions over the first component carrier and the second component carrier based at least in part on transmitting the DCI. The operations of 2020 may be performed according to the methods described herein. In some examples, aspects of the operations of 2020 may be performed by a data transmission manager as described with reference to FIGS. 11 through 14.

The following provides an overview of aspects of the present disclosure:

Aspect 1: A method for wireless communication, comprising: connecting to a base station over a set of component carriers according to a carrier aggregation configuration, the set of component carriers including at least a first component carrier and a second component carrier; monitoring a search space configured for scheduling multiple component carriers; receiving, from the base station, downlink control information comprising a carrier indicator field based at least in part on the monitoring, the downlink control information scheduling a plurality of data transmissions over two or more component carriers from the set of component carriers; determining that the two or more component carriers comprise the first component carrier and the second component carrier based at least in part on the monitored search space, the carrier indicator field within the downlink control information, or both; and transmitting or receiving the plurality of data transmissions over the first component carrier and the second component carrier based at least in part on the determining.

Aspect 2: The method of aspect 1, further comprising: receiving, prior to monitoring the search space, configuration information for the search space indicating that the search space is for scheduling the first component carrier and the second component carrier, wherein determining that the two or more component carriers comprise the first component carrier and the second component carrier is based at least in part on the configuration information.

Aspect 3: The method of aspect 2, further comprising: identifying a first value for the carrier indicator field indicating the first component carrier based at least in part on receiving the configuration information for the search space; and identifying a second value for the carrier indicator field indicating the second component carrier based at least in part on receiving the configuration information for the search space, wherein determining that the two or more component carriers comprise the first component carrier and the second component carrier is based at least in part on the carrier indicator field having the first value or the second value.

Aspect 4: The method of any of aspects 2 through 3, further comprising: identifying a value for the carrier indicator field indicating the first component carrier and the second component carrier based at least in part on receiving the configuration information for the search space, wherein determining that the two or more component carriers comprise the first component carrier and the second component carrier is based at least in part on the carrier indicator field having the value.

Aspect 5: The method of any of aspects 1 through 4, further comprising: receiving, prior to monitoring the search space, configuration information for the search space indicating that the search space is configured for scheduling a single component carrier and the multiple component carriers, wherein monitoring the search space is based at least in part on receiving the configuration information.

Aspect 6: The method of aspect 5, wherein the downlink control information is a first downlink control information and comprises the carrier indicator field having a first value indicating the multiple component carriers; and determining that the two or more component carriers comprise the first component carrier and the second component carrier is based at least in part on the carrier indicator field having the first value indicating the multiple component carriers.

Aspect 7: The method of aspect 6, further comprising: receiving, a second downlink control information scheduling a second plurality of data transmissions over the single component carrier based at least in part on monitoring the search space, the second downlink control information comprising a second carrier indicator field having a second value indicating the single component carrier.

Aspect 8: The method of any of aspects 6 through 7, further comprising: identifying the first value for the carrier indicator field indicating the multiple component carriers based at least in part on receiving the configuration information for the search space; and identifying a second value for the carrier indicator field indicating the single component carrier based at least in part on receiving the configuration information for the search space.

Aspect 9: The method of any of aspects 5 through 8, wherein the downlink control information is a first downlink control information and comprises the carrier indicator field having a value indicating the single component carrier and the multiple component carriers; and determining that the two or more component carriers comprise the first component carrier and the second component carrier is based at least in part on the carrier indicator field having the value indicating the single component carrier and the multiple component carriers.

Aspect 10: The method of aspect 9, further comprising: receiving a second downlink control information scheduling a second plurality of data transmissions over the single component carrier based at least in part on monitoring the search space, the second downlink control information comprising a second carrier indicator field having the value indicating the single component carrier and the multiple component carriers.

Aspect 11: The method of any of aspects 9 through 10, further comprising: identifying the value for the carrier indicator field indicating the single component carrier and the multiple component carriers based at least in part on receiving the configuration information for the search space.

Aspect 12: The method of any of aspects 1 through 11, further comprising: monitoring one or more additional search spaces separate from the search space configured for scheduling multiple component carriers, the one or more additional search spaces configured for scheduling single component carriers; and receiving, from the base station, second downlink control information scheduling data transmissions over the single component carriers based at least in part on monitoring the one or more additional search spaces.

Aspect 13: The method of any of aspects 1 through 12, further comprising: monitoring an additional search space separate from the search space configured for scheduling multiple component carriers, the additional search space configured for a third component carrier and a fourth component carrier different of the set of component carriers; and receiving, from the base station, second downlink control information scheduling data transmissions over the third component carrier and the fourth component carrier based at least in part on monitoring the additional search space.

Aspect 14: The method of any of aspects 1 through 13, wherein receiving the downlink control information further comprises: receiving the downlink control information over a third component carrier from the set of component carriers, wherein the third component carrier is different from the first component carrier and the second component carrier.

Aspect 15: The method of any of aspects 1 through 14, further comprising: receiving, from the base station, radio resource control signaling indicating a configuration for the search space, wherein monitoring the search space is based at least in part on receiving the radio resource control signaling.

Aspect 16: A method for wireless communication, comprising: connecting with a UE over a set of component carriers according to a carrier aggregation configuration, the set of component carriers including at least a first component carrier and a second component carrier; transmitting, to the UE, configuration information for a search space configured for scheduling multiple component carriers; transmitting downlink control information comprising a carrier indicator field based at least in part on transmitting the configuration information, the downlink control information scheduling a plurality of data transmissions over the first component carrier and the second component carrier, wherein the first component carrier and the second component carrier are indicated from the set of component carriers by the monitored search space, the carrier indicator field within the downlink control information, or both; and transmitting or receiving the plurality of data transmissions over the first component carrier and the second component carrier based at least in part on transmitting the downlink control information.

Aspect 17: The method of aspect 16, wherein transmitting the configuration information further comprises: transmitting configuration information for the search space indicating that the search space is for scheduling the first component carrier and the second component carrier, wherein indicating the first component carrier and the second component carrier from the set of component carriers is based at least in part on the configuration information.

Aspect 18: The method of aspect 17, wherein the configuration information indicates a first value for the carrier indicator field associated with the first component carrier and a second value for the carrier indicator field associated with the second component carrier; and indicating the first component carrier and the second component carrier from the set of component carriers is based at least in part on the carrier indicator field within the downlink control information having the first value or the second value.

Aspect 19: The method of any of aspects 17 through 18, wherein the configuration information indicates a value for the carrier indicator field associated with the first component carrier and the second component carrier; and indicating the first component carrier and the second component carrier from the set of component carriers is based at least in part on the carrier indicator field within the downlink control information having the value.

Aspect 20: The method of any of aspects 16 through 19, wherein transmitting the configuration information further comprises: transmitting configuration information for the search space indicating that the search space is configured for scheduling a single component carrier and the multiple component carriers.

Aspect 21: The method of aspect 20, wherein the downlink control information is a first downlink control information and comprises the carrier indicator field having a first value indicating the multiple component carriers; and indicating the first component carrier and the second component carrier from the set of component carriers is based at least in part on the carrier indicator field having the first value indicating the multiple component carriers.

Aspect 22: The method of aspect 21, further comprising: transmitting, a second downlink control information scheduling a second plurality of data transmissions over the single component carrier based at least in part on transmitting the configuration information, the second downlink control information comprising a second carrier indicator field having a second value indicating the single component carrier.

Aspect 23: The method of any of aspects 21 through 22, wherein the configuration information indicates the first value for the carrier indicator field associated with the multiple component carriers; and the configuration information indicates a second value for the carrier indicator field associated with the single component carrier.

Aspect 24: The method of any of aspects 20 through 23, wherein the downlink control information is a first downlink control information and comprises the carrier indicator field having a value indicating the single component carrier and the multiple component carriers; and indicating the first component carrier and the second component carrier from the set of component carriers is based at least in part on the carrier indicator field having the value indicating the single component carrier and the multiple component carriers.

Aspect 25: The method of aspect 24, further comprising: transmitting, a second downlink control information scheduling a second plurality of data transmissions over the single component carrier based at least in part on transmitting the configuration information, the second downlink control information comprising a second carrier indicator field having the value indicating the single component carrier and the multiple component carriers.

Aspect 26: The method of any of aspects 24 through 25, wherein the configuration information indicates the value for the carrier indicator field associated with the single component carrier and the multiple component carriers.

Aspect 27: The method of any of aspects 16 through 26, further comprising: transmitting configuration information for one or more additional search spaces separate from the search space configured for scheduling multiple component carriers, the one or more additional search spaces configured for scheduling single component carriers; and transmitting, to the UE, second downlink control information scheduling data transmissions over the single component carriers based at least in part on transmitting the configuration information for the one or more additional search spaces.

Aspect 28: The method of any of aspects 16 through 27, further comprising: transmitting configuration information for an additional search space separate from the search space configured for scheduling multiple component carriers, the additional search space configured for a third component carrier and a fourth component carrier different of the set of component carriers; and transmitting, to the UE, second downlink control information scheduling data transmissions over the third component carrier and the fourth component carrier based at least in part on transmitting the configuration information for the additional search space.

Aspect 29: The method of any of aspects 16 through 28, wherein transmitting the downlink control information further comprises: transmitting the downlink control information over a third component carrier from the set of component carriers, the third component carrier different from the first component carrier and the second component carrier.

Aspect 30: The method of any of aspects 16 through 29, wherein transmitting the configuration information further comprises: transmitting, to the UE, radio resource control signaling indicating the configuration information.

Aspect 31: An apparatus for wireless communication, comprising at least one processor; memory coupled to the at least one processor; and instructions stored in the memory and executable by the at least one processor to cause the apparatus to perform a method of any of aspects 1 through 15.

Aspect 32: An apparatus for wireless communication, comprising at least one means for performing a method of any of aspects 1 through 15.

Aspect 33: A non-transitory computer-readable medium storing code for wireless communication, the code comprising instructions executable by at least one processor to perform a method of any of aspects 1 through 15.

Aspect 34: An apparatus for wireless communication, comprising at least one processor; memory coupled to the at least one processor; and instructions stored in the memory and executable by the at least one processor to cause the apparatus to perform a method of any of aspects 16 through 30.

Aspect 35: An apparatus for wireless communication, comprising at least one means for performing a method of any of aspects 16 through 30.

Aspect 36: A non-transitory computer-readable medium storing code for wireless communication, the code comprising instructions executable by at least one processor to perform a method of any of aspects 16 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
connecting to a network entity over a set of component carriers according to a carrier aggregation configuration, the set of component carriers including at least a first component carrier and a second component carrier;
receiving configuration information for a search space indicating an association between the search space and multiple component carriers;
monitoring the search space configured for scheduling the multiple component carriers based at least in part on the association;
receiving, from the network entity, downlink control information comprising a carrier indicator field based at least in part on the monitoring, the downlink control information scheduling a plurality of data transmissions over two or more component carriers from the set of component carriers;
determining that the two or more component carriers comprise the first component carrier and the second component carrier based at least in part on the monitored search space, the carrier indicator field, or both; and
transmitting or receiving the plurality of data transmissions over the first component carrier and the second component carrier based at least in part on the determining.

2. The method of claim 1, further comprising:
receiving, prior to monitoring the search space, configuration information for the search space indicating that the search space is for scheduling the first component carrier and the second component carrier, wherein determining that the two or more component carriers comprise the first component carrier and the second component carrier is based at least in part on the configuration information.

3. The method of claim 2, further comprising:
identifying a first value for the carrier indicator field indicating the first component carrier based at least in part on receiving the configuration information for the search space; and
identifying a second value for the carrier indicator field indicating the second component carrier based at least in part on receiving the configuration information for the search space, wherein determining that the two or more component carriers comprise the first component carrier and the second component carrier is based at least in part on the carrier indicator field having the first value or the second value.

4. The method of claim 2, further comprising:
identifying a value for the carrier indicator field indicating the first component carrier and the second component carrier based at least in part on receiving the configuration information for the search space, wherein determining that the two or more component carriers comprise the first component carrier and the second component carrier is based at least in part on the carrier indicator field having the value.

5. The method of claim 1, further comprising:
receiving, prior to monitoring the search space, configuration information for the search space indicating that the search space is configured for scheduling a single component carrier and the multiple component carriers, wherein monitoring the search space is based at least in part on receiving the configuration information.

6. The method of claim 5, wherein:
the downlink control information is a first downlink control information and comprises the carrier indicator field having a first value indicating the multiple component carriers; and
determining that the two or more component carriers comprise the first component carrier and the second component carrier is based at least in part on the carrier indicator field having the first value indicating the multiple component carriers.

7. The method of claim 6, further comprising:
receiving, a second downlink control information scheduling a second plurality of data transmissions over the single component carrier based at least in part on monitoring the search space, the second downlink control information comprising a second carrier indicator field having a second value indicating the single component carrier.

8. The method of claim 6, further comprising:
identifying the first value for the carrier indicator field indicating the multiple component carriers based at least in part on receiving the configuration information for the search space; and
identifying a second value for the carrier indicator field indicating the single component carrier based at least in part on receiving the configuration information for the search space.

9. The method of claim 5, wherein:
the downlink control information is a first downlink control information and comprises the carrier indicator field having a value indicating the single component carrier and the multiple component carriers; and
determining that the two or more component carriers comprise the first component carrier and the second component carrier is based at least in part on the carrier indicator field having the value indicating the single component carrier and the multiple component carriers.

10. The method of claim 9, further comprising:
receiving a second downlink control information scheduling a second plurality of data transmissions over the single component carrier based at least in part on monitoring the search space, the second downlink control information comprising a second carrier indicator field having the value indicating the single component carrier and the multiple component carriers.

11. The method of claim 9, further comprising:
identifying the value for the carrier indicator field indicating the single component carrier and the multiple component carriers based at least in part on receiving the configuration information for the search space.

12. The method of claim 1, further comprising:
monitoring one or more additional search spaces separate from the search space configured for scheduling multiple component carriers, the one or more additional search spaces configured for scheduling single component carriers; and
receiving, from the network entity, second downlink control information scheduling data transmissions over the single component carriers based at least in part on monitoring the one or more additional search spaces.

13. The method of claim 1, further comprising:
monitoring an additional search space separate from the search space configured for scheduling multiple component carriers, the additional search space configured for a third component carrier and a fourth component carrier different of the set of component carriers; and
receiving, from the network entity, second downlink control information scheduling data transmissions over the third component carrier and the fourth component carrier based at least in part on monitoring the additional search space.

14. A method for wireless communication, comprising:
connecting with a user equipment (UE) over a set of component carriers according to a carrier aggregation configuration, the set of component carriers including at least a first component carrier and a second component carrier;
transmitting, to the UE, configuration information for a search space configured for scheduling multiple component carriers, the configuration information for the search space indicating an association between the search space and the multiple component carriers, the association used for monitoring the search space for scheduling multiple component carriers;
transmitting downlink control information comprising a carrier indicator field based at least in part on transmitting the configuration information, the downlink control information scheduling a plurality of data transmissions over the first component carrier and the second component carrier, wherein the first component carrier and the second component carrier are indicated from the set of component carriers by the monitored search space, the carrier indicator field, or both; and
transmitting or receiving the plurality of data transmissions over the first component carrier and the second component carrier based at least in part on transmitting the downlink control information.

15. The method of claim 14, wherein transmitting the configuration information further comprises:
transmitting configuration information for the search space indicating that the search space is for scheduling the first component carrier and the second component carrier, wherein indicating the first component carrier and the second component carrier from the set of component carriers is based at least in part on the configuration information.

16. An apparatus for wireless communication, comprising:
at least one processor,
memory coupled to the at least one processor, the memory storing instructions for the at least one processor to cause the apparatus to:
connect to a network entity over a set of component carriers according to a carrier aggregation configuration, the set of component carriers including at least a first component carrier and a second component carrier;
receive configuration information for a search space indicating an association between the search space and multiple component carriers;
monitor a search space configured for scheduling the multiple component carriers based at least in part on the association;
receive, from the network entity, downlink control information comprising a carrier indicator field based at least in part on the monitoring, the downlink control information scheduling a plurality of data transmissions over two or more component carriers from the set of component carriers;
determine that the two or more component carriers comprise the first component carrier and the second component carrier based at least in part on the monitored search space, the carrier indicator field, or both; and
transmit or receive the plurality of data transmissions over the first component carrier and the second component carrier based at least in part on the determining.

17. The apparatus of claim 16, wherein the instructions are further for the at least one processor to cause the apparatus to:
receive, prior to monitoring the search space, configuration information for the search space indicating that the search space is for scheduling the first component carrier and the second component carrier, wherein determining that the two or more component carriers comprise the first component carrier and the second component carrier is based at least in part on the configuration information.

18. The apparatus of claim 17, wherein the instructions are further for the at least one processor to cause the apparatus to:
identify a first value for the carrier indicator field indicating the first component carrier based at least in part on receiving the configuration information for the search space; and
identify a second value for the carrier indicator field indicating the second component carrier based at least in part on receiving the configuration information for the search space, wherein determining that the two or more component carriers comprise the first component carrier and the second component carrier is based at least in part on the carrier indicator field having the first value or the second value.

19. The apparatus of claim 17, wherein the instructions are further for the at least one processor to cause the apparatus to:
identify a value for the carrier indicator field indicating the first component carrier and the second component carrier based at least in part on receiving the configuration information for the search space, wherein determining that the two or more component carriers comprise the first component carrier and the second component carrier is based at least in part on the carrier indicator field having the value.

20. The apparatus of claim 16, wherein the instructions are further for the at least one processor to cause the apparatus to:
receive, prior to monitoring the search space, configuration information for the search space indicating that the search space is configured for scheduling a single component carrier and the multiple component carriers, wherein monitoring the search space is based at least in part on receiving the configuration information.

21. The apparatus of claim 20, wherein:
the downlink control information is a first downlink control information and comprises the carrier indicator field having a first value indicating the multiple component carriers; and
determining that the two or more component carriers comprise the first component carrier and the second component carrier is based at least in part on the carrier indicator field having the first value indicating the multiple component carriers.

22. The apparatus of claim 21, wherein the instructions are further for the at least one processor to cause the apparatus to:
receive, a second downlink control information scheduling a second plurality of data transmissions over the single component carrier based at least in part on monitoring the search space, the second downlink control information comprising a second carrier indicator field having a second value indicating the single component carrier.

23. The apparatus of claim 21, wherein the instructions are further for the at least one processor to cause the apparatus to:
identify the first value for the carrier indicator field indicating the multiple component carriers based at least in part on receiving the configuration information for the search space; and
identify a second value for the carrier indicator field indicating the single component carrier based at least in part on receiving the configuration information for the search space.

24. The apparatus of claim 20, wherein:
the downlink control information is a first downlink control information and comprises the carrier indicator field having a value indicating the single component carrier and the multiple component carriers; and
determining that the two or more component carriers comprise the first component carrier and the second component carrier is based at least in part on the carrier indicator field having the value indicating the single component carrier and the multiple component carriers.

25. The apparatus of claim 24, wherein the instructions are further for the at least one processor to cause the apparatus to:
receive a second downlink control information scheduling a second plurality of data transmissions over the single component carrier based at least in part on monitoring the search space, the second downlink control information comprising a second carrier indicator field having the value indicating the single component carrier and the multiple component carriers.

26. The apparatus of claim 24, wherein the instructions are further for the at least one processor to cause the apparatus to:
identify the value for the carrier indicator field indicating the single component carrier and the multiple component carriers based at least in part on receiving the configuration information for the search space.

27. The apparatus of claim 16, wherein the instructions are further for the at least one processor to cause the apparatus to:
monitor one or more additional search spaces separate from the search space configured for scheduling multiple component carriers, the one or more additional search spaces configured for scheduling single component carriers; and
receive, from the network entity, second downlink control information scheduling data transmissions over the single component carriers based at least in part on monitoring the one or more additional search spaces.

28. The apparatus of claim 16, wherein the instructions are further for the at least one processor to cause the apparatus to:
monitor an additional search space separate from the search space configured for scheduling multiple component carriers, the additional search space configured for a third component carrier and a fourth component carrier different of the set of component carriers; and
receive, from the network entity, second downlink control information scheduling data transmissions over the third component carrier and the fourth component carrier based at least in part on monitoring the additional search space.

29. An apparatus for wireless communication, comprising:
at least one processor,
memory coupled to the at least one processor, the memory storing instructions for the at least one processor to cause the apparatus to:
connect with a user equipment (UE) over a set of component carriers according to a carrier aggregation configuration, the set of component carriers including at least a first component carrier and a second component carrier;
transmit, to the UE, configuration information for a search space configured for scheduling multiple component carriers, the configuration information for the search space indicating an association between the search space and the multiple component carriers, the association used for monitoring the search space for scheduling multiple component carriers;
transmit downlink control information comprising a carrier indicator field based at least in part on transmitting the configuration information, the downlink control information scheduling a plurality of data transmissions over the first component carrier and the second component carrier, wherein the first component carrier and the second component carrier are indicated from the set of component carriers by the monitored search space, the carrier indicator field, or both; and
transmit or receive the plurality of data transmissions over the first component carrier and the second component carrier based at least in part on transmitting the downlink control information.

30. The apparatus of claim 29, wherein the instructions to transmit the configuration information are further for the at least one processor to cause the apparatus to:
transmit configuration information for the search space indicating that the search space is for scheduling the first component carrier and the second component carrier, wherein indicating the first component carrier and the second component carrier from the set of component carriers is based at least in part on the configuration information.

* * * * *